United States Patent
Ye et al.

(10) Patent No.: US 10,834,479 B2
(45) Date of Patent: *Nov. 10, 2020

(54) INTERACTION METHOD BASED ON MULTIMEDIA PROGRAMS AND TERMINAL DEVICE

(71) Applicant: Tencent Technology (Shenzhen) Company Limited, Shenzhen (CN)

(72) Inventors: Wa Ye, Shenzhen (CN); Hongyang Wang, Shenzhen (CN); Jie Hou, Shenzhen (CN); Zhenyu Xu, Shenzhen (CN); Zhuo Tang, Shenzhen (CN); Rui Wang, Shenzhen (CN); Keren Li, Shenzhen (CN); Bo Sun, Shenzhen (CN); Jing Zang, Shenzhen (CN)

(73) Assignee: TENCENT TECHNOLOGY (SHENZHEN) COMPANY LIMITED, Guangdong Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/460,856

(22) Filed: Jul. 2, 2019

(65) Prior Publication Data
US 2019/0327539 A1 Oct. 24, 2019

Related U.S. Application Data

(63) Continuation of application No. 15/219,102, filed on Jul. 25, 2016, now Pat. No. 10,390,108, which is a
(Continued)

(30) Foreign Application Priority Data

Jun. 13, 2014 (CN) .......................... 2014 1 0265804

(51) Int. Cl.
*G06F 3/00* (2006.01)
*G06F 13/00* (2006.01)
(Continued)

(52) U.S. Cl.
CPC ... *H04N 21/8545* (2013.01); *H04N 21/23418* (2013.01); *H04N 21/41407* (2013.01);
(Continued)

(58) Field of Classification Search
CPC ......... H04N 21/8545; H04N 21/23418; H04N 21/41407; H04N 21/4223;
(Continued)

(56) References Cited

U.S. PATENT DOCUMENTS 10,390,108 B2 * 8/2019 Ye ...................... H04N 21/4722
2011/0067045 A1 3/2011 Matheny et al.
(Continued)

FOREIGN PATENT DOCUMENTS

CN 101021857 A 8/2007
CN 102843599 A 12/2012
(Continued)

OTHER PUBLICATIONS

Tencent Technology, ISRWO, PCT/CN2015/081190, dated Sep. 10, 2015, 7 pgs.
(Continued)

*Primary Examiner* — Kyu Chae
(74) *Attorney, Agent, or Firm* — Morgan, Lewis & Bockius LLP

(57) ABSTRACT

An interaction method based on multimedia programs, a terminal device, a server and a system are disclosed, which belong to the field of network technologies. The method includes: acquiring at least one image clip information of a multimedia program in a process of playing back the multimedia program; sending the image clip information, the image clip information being used for matching corresponding multimedia program information; receiving interaction information corresponding to the multimedia program information; and outputting an interactive interface, to interact
(Continued)

with the multimedia program based on an interaction operation on the interactive interface. The present disclosure is easy to operate, and improves interaction efficiency.

20 Claims, 26 Drawing Sheets

Related U.S. Application Data continuation of application No. PCT/CN2015/081190, filed on Jun. 10, 2015.

(51) Int. Cl.

| | | |
|---|---|---|
| *H04N 5/445* | (2011.01) | |
| *H04N 7/173* | (2011.01) | |
| *H04N 21/8545* | (2011.01) | |
| *H04N 21/414* | (2011.01) | |
| *H04N 21/475* | (2011.01) | |
| *H04N 21/4223* | (2011.01) | |
| *H04N 21/472* | (2011.01) | |
| *H04N 21/4722* | (2011.01) | |
| *H04N 21/658* | (2011.01) | |
| *H04N 21/234* | (2011.01) | |
| *H04N 21/442* | (2011.01) | |
| *H04N 21/4784* | (2011.01) | |
| *H04N 21/4788* | (2011.01) | |

(52) U.S. Cl.
CPC ... *H04N 21/4223* (2013.01); *H04N 21/44222* (2013.01); *H04N 21/472* (2013.01); *H04N 21/4722* (2013.01); *H04N 21/4758* (2013.01); *H04N 21/4784* (2013.01); *H04N 21/4788* (2013.01); *H04N 21/6581* (2013.01)

(58) Field of Classification Search
CPC .......... H04N 21/44222; H04N 21/472; H04N 21/4722; H04N 21/4758; H04N 21/4784; H04N 21/4788; H04N 21/6581
See application file for complete search history.

(56) References Cited

U.S. PATENT DOCUMENTS

| | | |
|---|---|---|
| 2011/0289532 A1 | 11/2011 | Yu et al. |
| 2012/0239673 A1 | 9/2012 | Yun et al. |
| 2012/0294495 A1 | 11/2012 | Wren et al. |
| 2013/0132985 A1 | 5/2013 | Howcroft et al. |
| 2013/0139202 A1 | 5/2013 | Purpura et al. |
| 2014/0055367 A1 | 2/2014 | Dearman et al. |
| 2014/0068649 A1 | 3/2014 | Badros et al. |
| 2016/0080819 A1 | 3/2016 | Moran et al. |
| 2016/0261918 A1 | 9/2016 | Wyatt et al. |
| 2016/0323646 A1 | 11/2016 | Pratt et al. |

FOREIGN PATENT DOCUMENTS

| | | |
|---|---|---|
| CN | 103152646 A | 6/2013 |
| CN | 103634690 A | 3/2014 |
| CN | 103686256 A | 3/2014 |
| CN | 103731685 A | 4/2014 |
| CN | 104093079 A | 10/2014 |
| JP | 2014002616 A | 1/2014 |
| WO | WO 2014029906 A1 | 2/2014 |

OTHER PUBLICATIONS

Tencent Technology, IPRP, PCT/CN2015/081190, dated Dec. 15, 2016, 5 pgs.

\* cited by examiner

INTERACTION METHOD BASED ON MULTIMEDIA PROGRAMS AND TERMINAL DEVICE

CROSS REFERENCE TO RELATED APPLICATIONS

This is a continuation application of U.S. application Ser. No. 15/219,102, filed on Jul. 25, 2016, which claims priority to International Patent Application No. PCT/CN2015/081190, filed on Jun. 10, 2015, which claims priority to Chinese Patent Application No. 201410265804.4 filed on Jun. 13, 2014, all of which are incorporated by reference herein in their entirety.

TECHNICAL FIELD

The present disclosure relates to the field of network technologies, and in particular, to an interaction method based on multimedia programs, a terminal device, a server and a system.

BACKGROUND

In order to enhance communications between users, a program producer may configure an interactive program in the middle of a program, to guide the users to participate in interaction. By taking that the producer is a TV station as an example, the TV station may insert an interactive program in the middle of a program, the interactive program prompts the users to send short messages to a specified number or leave a message at a specified website in manners such as presenter broadcast and text broadcast.

In the interaction manners, the users can send short messages or leave a message at a specified website only by performing operations of editing text, the operations are too tedious, and interaction efficiency is very low.

SUMMARY

In view of the above, embodiments of the present invention provide an interaction method based on multimedia programs, a terminal device, a server and a system. The technical solutions are as follows.

According to a first aspect of the present application, an interaction method based on multimedia programs is performed at a server, the method including:
receiving image clip information of a multimedia program from a playback device, the image clip information being acquired in a process of playing back the multimedia program by the playback device adjacent to a terminal device; determining multimedia program information matching the image clip information and an interaction form according to the image clip information;
acquiring interaction information corresponding to the multimedia program information, wherein the interaction information includes a first user ID of an instant messaging (IM) application and an instruction of invoking the IM application; and sending the interaction information to the terminal device, wherein the terminal device is configured to output, according to the interaction information, an interactive interface at least comprising the interaction form, to interact with the multimedia program based on the interaction form, the interaction form referring to a type of information sent and received by the terminal device based on an interaction operation on the interactive interface.

According to a second aspect of the present application, a server has a memory; one or more processors; and one or more program modules stored in the memory. The program modules, when executed by the one or more processors, cause the server to perform the aforementioned interaction method.

According to a third aspect of the present application, a non-transitory computer readable storage medium stores one or more program modules that, when executed by a server having one or more processors, cause the server to perform the aforementioned interaction method.

According to the methods, the terminal device, the server and the system in the embodiments of the present invention, at least one image clip information of a multimedia program is acquired in a process of playing back the multimedia program, the image clip information being used for matching corresponding multimedia program information, interaction information corresponding to the multimedia program information is received, an interactive interface is output, and interaction with the multimedia program is performed based on an interaction operation on the interactive interface. As participation in interaction can be done by a simple interaction operation on the interactive interface, the operation is easy, thereby improving interaction efficiency.

BRIEF DESCRIPTION OF THE DRAWINGS

To describe the technical solutions of the embodiments of the present invention more clearly, the following briefly introduces the accompanying drawings required for describing the embodiments. Apparently, the accompanying drawings in the following description show only some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are some of the embodiments of the present invention rather than all of the embodiments. All other embodiments obtained by a person of ordinary skill in the art based on the embodiments of the present invention without creative efforts shall fall within the protection scope of the present disclosure.

Figure 1:
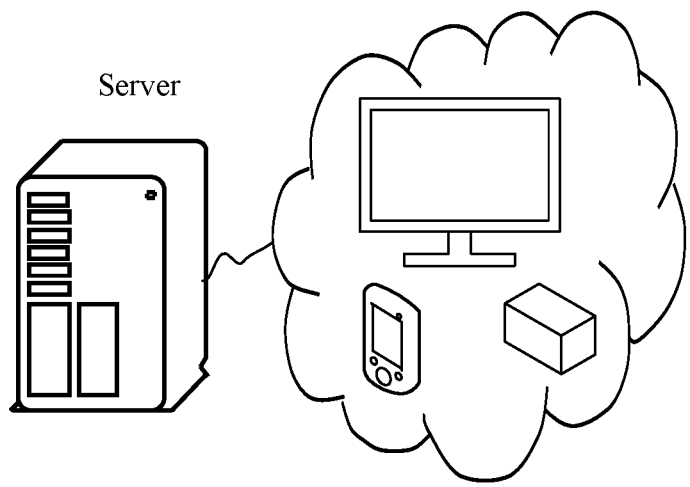
FIG. 1 is a schematic structural diagram of an interaction system based on multimedia programs according to one embodiment of the present invention.

FIG. 1 is a schematic structural diagram of an interaction system based on multimedia programs according to one embodiment of the present invention. Referring to FIG. 1, the interaction system includes:

a terminal device and a server, and the server and the terminal device are connected through a network.

The terminal device is configured to acquire at least one image clip information of a multimedia program in a process of playing back the multimedia program, and send the image clip information to the server, he image clip information being used for matching corresponding multimedia program information. The server is configured to, when receiving the image clip information, determine multimedia program information matching the image clip information according to the image clip information, acquire interaction information corresponding to the multimedia program information, and send the interaction information to the terminal device. The terminal device is further configured to receive the interaction information, and output an interactive interface, to interact with the multimedia program based on an interaction operation on the interactive interface.

A device playing back the multimedia program is referred to as a playback device, the terminal device may be a device integrated with the playback device, that is, the terminal device can play back the multimedia program and can also acquire at least one image clip information of the multimedia program in the process of playing back the multimedia program, the terminal device may be a smart TV integrated with a set-top box or a smart TV set-top box, etc., and a user can control the terminal device by using a remote control or a key provided by the terminal device. The terminal device may also be a device independent of the playback device, and in the process that the playback device plays back the multimedia program, the terminal device may acquire at least one image clip information of the multimedia program. For example, the playback device is a smart TV or a smart TV set-top box, and the terminal device is a smart phone or a tablet computer or the like. The embodiment of the present invention does not limit the terminal device and the playback device.

Referring to FIG. 1, when the playback device is the smart TV, the terminal device may be the smart TV per se or the set-top box, and may also be the smart phone.

Figure 2:
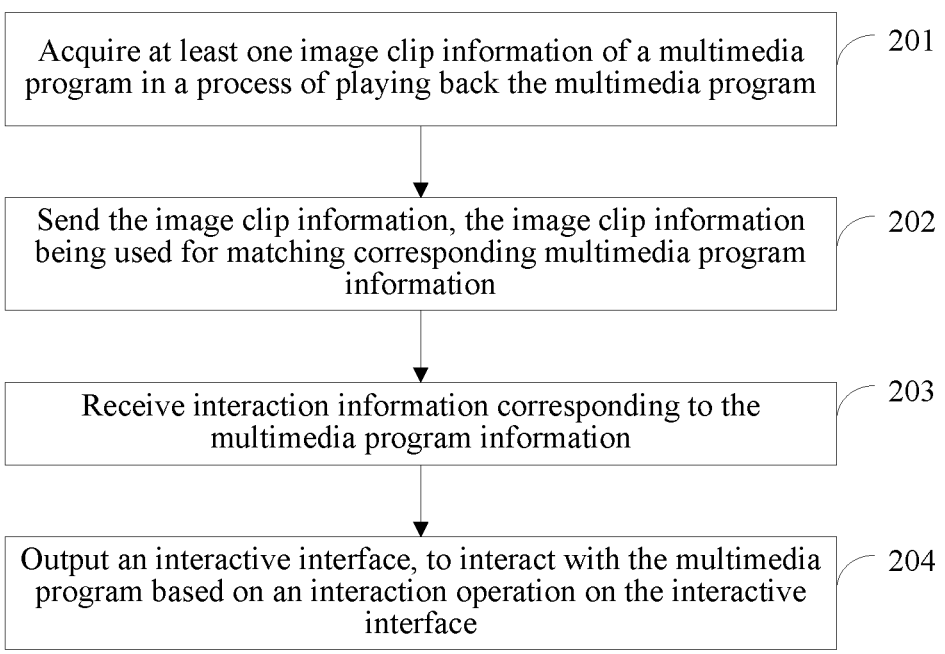
FIG. 2 is a flowchart of an interaction method based on multimedia programs according to one embodiment of the present invention.

FIG. 2 is a flowchart of an interaction method based on multimedia programs according to one embodiment of the present invention. An execution body of the embodiment of the present invention is a terminal device; referring to FIG. 2, the method includes:

201. Acquire at least one image clip information of a multimedia program in a process of playing back the multimedia program.

202. Send the image clip information, the image clip information being used for matching corresponding multimedia program information.

203. Receive interaction information corresponding to the multimedia program information.

204. Output an interactive interface, to interact with the multimedia program based on an interaction operation on the interactive interface.

According to the method in the embodiment of the present invention, at least one image clip information of a multimedia program is acquired in a process of playing back the multimedia program, the image clip information being used for matching corresponding multimedia program information, interaction information corresponding to the multimedia program information is received, an interactive interface is output, and interaction with the multimedia program is performed based on an interaction operation on the interactive interface. As participation in interaction can be done by a simple interaction operation on the interactive interface, the operation is easy, thereby improving interaction efficiency.

The acquiring at least one image clip information of a multimedia program includes:

scanning a display screen where the multimedia program is played, to obtain the at least one image clip information of the multimedia program.

The outputting an interactive interface, to interact with the multimedia program based on an interaction operation on the interactive interface includes:

when the interaction information includes multiple candidate options, outputting an interactive interface at least including the multiple candidate options, and when a selection operation on a specified candidate option in the interactive interface is detected, sending the specified candidate option.

The outputting an interactive interface, to interact with the multimedia program based on an interaction operation on the interactive interface includes:

when the interaction information includes prompt information, outputting an interactive interface at least including the prompt information and an input field, acquiring response information input in the input field, and sending the response information.

The outputting an interactive interface, to interact with the multimedia program based on an interaction operation on the interactive interface includes:

when the interaction information includes lottery information, outputting an interactive interface at least including the lottery information, receiving a lottery result, and displaying the lottery result in the lottery interface.

The outputting an interactive interface, to interact with the multimedia program based on an interaction operation on the interactive interface includes:

when the interaction information includes a target value, outputting a target display interface at least including the target value and an exchange option, if a click operation on the exchange option is detected, outputting a value transfer interface at least including the target value and a value transfer option, and if a click operation on the value transfer option is detected, sending a value transfer request for the target; or when the interaction information includes a target value, outputting a value transfer interface at least including the target value and a value transfer option, and if a click operation on the value transfer option is detected, sending a value transfer request for the target.

The outputting an interactive interface, to interact with the multimedia program based on an interaction operation on the interactive interface includes:

when the interaction information is a first user ID and an instruction of calling an instant messaging (IM) session window, judging whether a user relation chain of a second user ID used by the terminal device includes the first user ID;

when the user relation chain of the second user ID includes the first user ID, outputting an interactive interface at least including an IM session window of the second user ID and the first user ID, acquiring IM messages input in the IM session window, and sending the IM messages based on the second user ID; or when the user relation chain of the second user ID does not include the first user ID, outputting an interactive interface at least including details information and an attention option of the first user ID, and if a click operation on the attention option in the interactive interface is detected, sending an attention request for the first user ID.

The outputting an interactive interface, to interact with the multimedia program based on an interaction operation on the interactive interface includes:

when the interaction information is multimedia program information, outputting an interactive interface at least including the multimedia program information, the interactive interface being configured to display the multimedia program information.

All the above optional technical solutions can form optional embodiments of the present invention in any combination, which are not repeated herein one by one.

Figure 3:
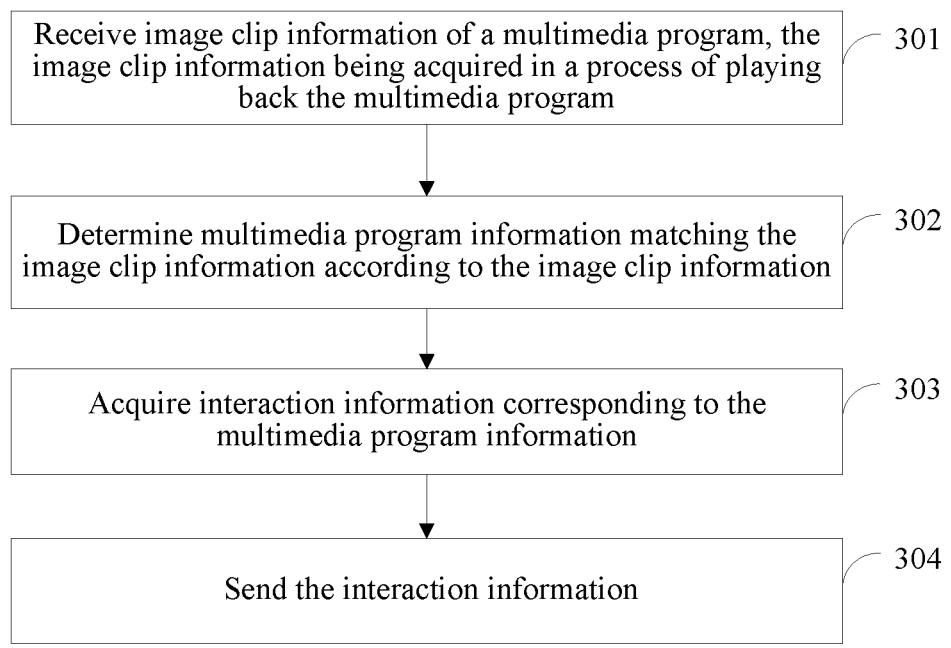
FIG. 3 is a flowchart of an interaction method based on multimedia programs according to one embodiment of the present invention.

FIG. 3 is a flowchart of an interaction method based on multimedia programs according to one embodiment of the present invention. An execution body of the embodiment of the present invention is a server; referring to FIG. 3, the method includes:

301. Receive image clip information of a multimedia program, the image clip information being acquired in a process of playing back the multimedia program.

302. Determine multimedia program information matching the image clip information according to the image clip information.

303. Acquire interaction information corresponding to the multimedia program information.

304. Send the interaction information.

According to the method in the embodiment of the present invention, a server, when receiving image clip information of a multimedia program, returns interaction information corresponding to the multimedia program information to the terminal device, to cause the terminal device to output an interactive interface, so as to interact with the multimedia program based on an interaction operation on the interactive interface. As participation in interaction can be done by a simple interaction operation on the interactive interface, the operation is easy, thereby improving interaction efficiency.

The determining multimedia program information matching the image clip information according to the image clip information includes:

traversing image information of each multimedia program stored, determining the image information matching the image clip information, and determining multimedia program information of the matched image information.

Before the determining multimedia program information matching the image clip information according to the image clip information, the method further includes:

taking a screenshot of each multimedia program, to obtain a plurality of image information.

After the sending the interaction information, the method further includes:

when the interaction information includes multiple candidate options, if a specified candidate option is received, increasing the number of the specified candidate option; or when the interaction information includes multiple candidate options, if a specified candidate option is received, judging whether the specified candidate option is correct, and sending virtual reward data according to a judgment result.

After the sending the interaction information, the method further includes:

when the interaction information includes prompt information, if response information is received, judging whether the response information is correct, and sending virtual reward data according to a judgment result; or when the interaction information includes prompt information, if response information is received, releasing the response information; or when the interaction information is lottery information, acquiring a lottery result corresponding to the lottery information, and sending the lottery information.

After the sending the interaction information, the method further includes:

when the interaction information includes a target value, if a value transfer request for the target is received, performing a value transfer operation according to the value, account information corresponding to the target and account information corresponding to a terminal device that sends the value transfer request.

After the sending the interaction information, the method further includes:

when the interaction information is a first user ID and an instruction of calling an IM session window, if an IM message is received, sending the IM message to a terminal device where the first user ID is; or when the interaction information is a first user ID and an instruction of calling an IM session window, if an attention request sent by a terminal device is received, adding the first user ID to a user relation chain of the terminal device.

All the above optional technical solutions can form optional embodiments of the present invention in any combination, which are not repeated herein one by one.

In the embodiment of the present invention, the image clip information may include vote-related content, for example, vote for each singer in a singer contest; or include interactive quiz-related content, for example, predict the outcome of an ongoing game; or include exchange-target-related content, for example, recommend goods that are being sold; or include character-related content, for example, a star interviewed in a star talk show or the like. For the image clip information including different content, the interaction information acquired by the server is different, an interaction form between the terminal device and the server is different, the interaction form refers to the type of information sent by the terminal device to the server based on an interaction operation on the interactive interface and the type of information returned by the server to the terminal device, and the interaction form includes, but is not limited to, vote, interactive quiz, lottery, exchange target, target value transfer and the like. For ease of description, interaction methods based on multimedia programs corresponding to different image clip information are specifically described below in combination with the content and the interaction system in the foregoing embodiments.

Figure 4A:
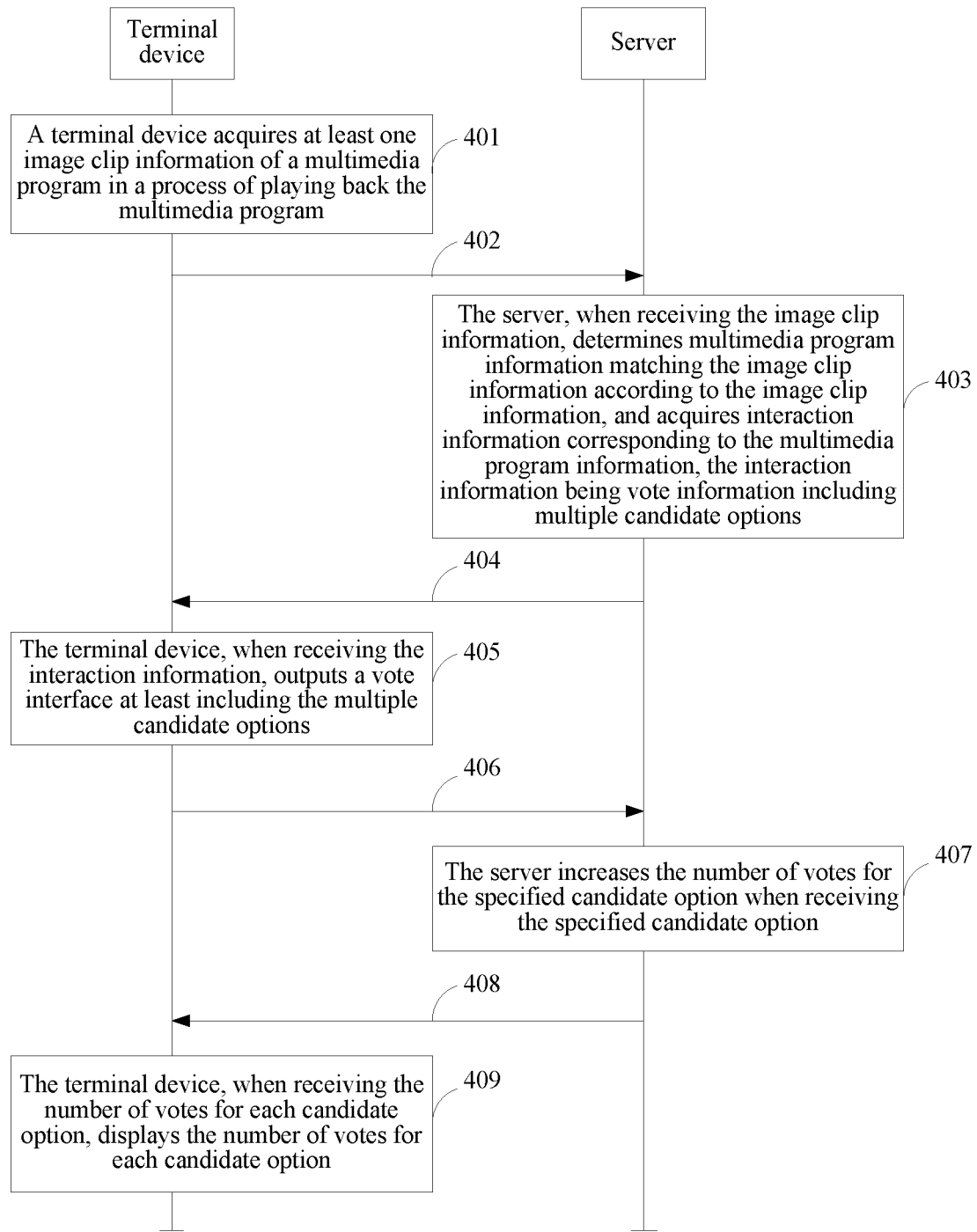
FIG. 4A is a flowchart of an interaction method based on multimedia programs according to one embodiment of the present invention.

FIG. 4A is a flowchart of an interaction method based on multimedia programs according to one embodiment of the present invention. Interaction bodies in the embodiment of the present invention are a terminal device and a server; for ease of description, the embodiment of the present invention takes that the image clip information includes vote-related content as an example, and interaction information corresponding to the image clip information is vote information including multiple candidate options; referring to FIG. 4A, the method includes:

401. A terminal device acquires at least one image clip information of a multimedia program in a process of playing back the multimedia program.

The terminal device may be a device integrated with the playback device or a device independent of the playback device. When the terminal device is a device independent of the playback device, the terminal device and the playback device achieve dual-screen interaction, when users vote on the terminal device, the playback device may continue to play back the multimedia program, continuity is strong, and it is unnecessary to interrupt the process that the users watch the multimedia program, thereby increasing the number of users participating in the interaction and enhancing user viscosity.

In addition, the server provides a multimedia program for the playback device, the playback device can download the multimedia program from the server, and plays back the downloaded multimedia program offline, or the playback device can send a request for playing back the multimedia program online to the server, the server, when receiving the request, compresses the multimedia program, to obtain a streaming media file, and sends the streaming media file to the playback device, and the playback device, when receiving the streaming media file, caches the streaming media file and then can play back the streaming media file. When the server compresses a network video file, the streaming media file obtained is video streaming, and when the server compresses a network audio file, the streaming media file obtained is audio streaming.

In the process of playing back the multimedia program, users can actively use the terminal device to acquire image clip information of the multimedia program. However, in order to increase the number of user participating in interaction, when an activity organizer launches an interactive activity, the server can previously insert a clip multimedia program configured to prompt users to participate in interaction into the multimedia program, when playback comes to the clip multimedia program, the users are prompted to participate in interaction, and at this time, the users can use the terminal device to acquire image clip information of the clip multimedia program as prompted. Afterwards, when the activity organizer wishes to end the interactive activity, the server can delete the clip multimedia program from the multimedia program.

Different from interactive programs real-time played back at the TV station, the multimedia program can be played back repeatedly, each time the multimedia program is played back, users can be guided to participate in interaction, which prolongs the effective time of prompting the users, increases the number of users participating in interaction and enhances user viscosity.

Specifically, in the process of playing back the multimedia program, the terminal device scans the display screen through a scan interface provided by a specified function application, to obtain image information of the multimedia program.

In the embodiment of the present invention, the terminal device maybe installed with a specified function application, and the specified function application is configured to acquire image clip information of a multimedia program being played back, and send the image clip information to the server. During running of the specified function application, the terminal device scans a display screen on which a multimedia program is being played back through a scan interface provided by the specified function application, and at this time, the terminal device can obtain image information being played back on the display screen, that is, image clip information of the multimedia program. The specified function application may be an IM application, an information display application or an application specifically configured to acquire image clip information on TVs or the like, which is not limited in the embodiment of the present invention.

Figure 4B:
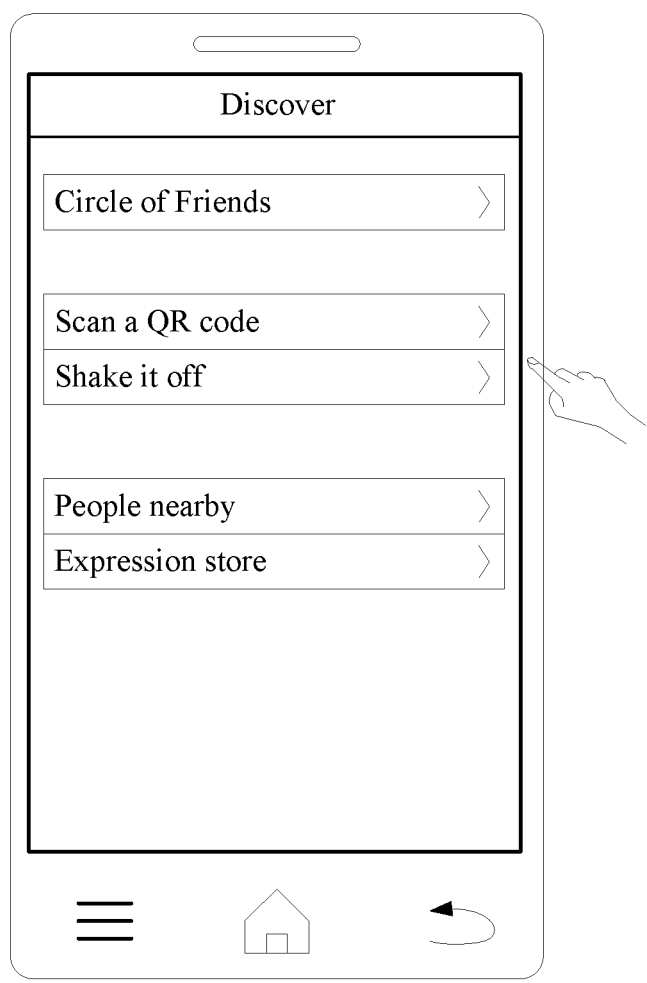
FIG. 4B is a schematic diagram of a function option interface according to one embodiment of the present invention.
Figure 4C:
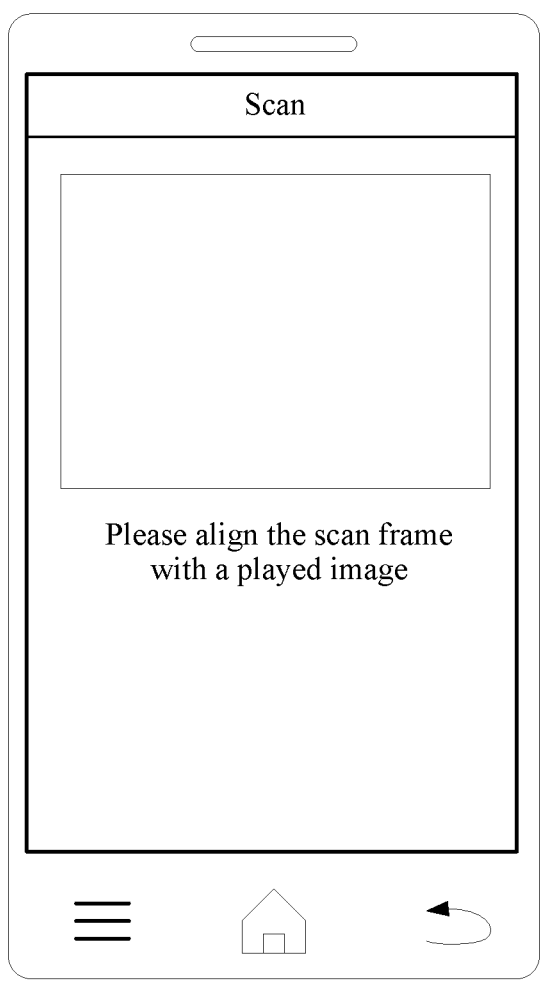
FIG. 4C is a schematic diagram of a scan interface according to one embodiment of the present invention.

Referring to FIG. 4B, by taking that the playback device is a smart TV and the terminal device is a smart phone as an example, in the process that the smart TV plays back the multimedia program, the terminal device can open a function option interface provided by an IM application, when the terminal device detects a user's click operation on a "scan a QR code" function option, a scan interface as shown in FIG. 4C is displayed, the scan interface including a scan box, at this time, a user can align a camera of the terminal device with a display screen of the smart TV, to make the display screen of the smart TV project into the scan box, and the terminal device scans the display screen to obtain image clip information of the multimedia program, so that the terminal device acquires interaction information corresponding to the multimedia program according to the image clip information subsequently, and the operation is simple and quick.

In the embodiment of the present invention, the terminal device may scan the display screen once, to obtain one image clip information, and may scan the display screen multiple times, to obtain a plurality of image clip information. The terminal device pre-determines the number of scanning, and when determining that scanning comes to the display screen, performs scanning according to the number of scanning, to obtain image clip information corresponding to the number of scanning. Further, the terminal device pre-determines the number of scanning and a scan frequency, when determining that scanning comes to the display screen, performs scanning according to the scan frequency, and stops scanning until acquiring image clip information corresponding to the number of scanning. The embodiment of the present invention does not define the number of the image clip information.

In the embodiment of the present invention, the multimedia program may be a video program or an audio program, and correspondingly, the terminal device may acquire image clip information of the multimedia program or may acquire video clip information or audio clip information of the multimedia program, which is not limited in the embodiment of the present invention.

Further, when the type of the clip information varies, the terminal device acquires the clip information in a different manner. Correspondingly, step 401 may be replaced with step 401*a*:

401*a*. In the process of playing back a multimedia program, when the terminal device receives a shake instruction during running of a specified function of the specified function application, video clip information or audio clip information of the multimedia program is recorded.

In order to prevent that a shake instruction for implementing another function is mistakenly identified as the shake instruction for recording video information or audio information in the embodiment of the present invention, the terminal device receives the shake instruction during running of a specified function of the specified function application. The specified function may be a shake function of the specified function application or a playback device shake function of the specified function application or the like, the terminal device waits for receiving the shake instruction when opening the specified function, and the terminal device records video clip information or audio clip information of the playback device when receiving the shake instruction, that is, when the multimedia program is a video program, video clip information or audio clip information of the video program is recorded, and when the multimedia program is an audio program, audio clip information of the audio program is recorded.

When receiving the shake instruction, the terminal device begins to record video information or audio information of the multimedia program, and ends recording when a recording duration reaches a first specified duration, to obtain recorded video clip information or audio clip information. The first specified duration may be 2 s, 3 s or another duration, may be pre-determined by the user, or may be determined and sent to the terminal device by the server, which is not limited in the embodiment of the present invention.

Figure 4D:
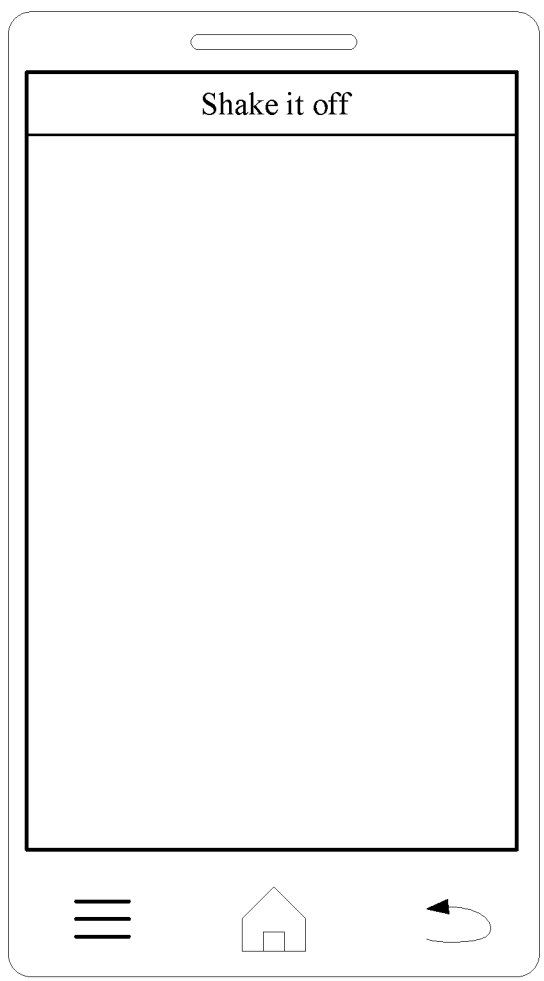
FIG. 4D is a schematic diagram of a shake interface according to one embodiment of the present invention.

Referring to FIG. 4B, in the process that the playback device plays back the multimedia program, the terminal device can open a function option interface provided by the IM application, and the terminal device, when detecting a user's click operation on a "shake it off" function option, opens the shake function, and displays a shake interface as shown in FIG. 4D, to wait for receiving a shake instruction. When a user shakes the terminal device, the terminal device receives the shake instruction and records the video clip information or audio clip information, so that the terminal device acquires interaction information corresponding to the video clip information or audio clip information subsequently, and the operation is simple and quick.

402. The terminal device sends the image clip information to the server. In order to acquire interaction information corresponding to the clip information, the terminal device sends the image clip information to the server.

The terminal device sends the image clip information to the server based on a user ID, so that the server returns interaction information corresponding to the image clip information based on the user ID. The user ID may be a user account, a mobile phone number or a terminal device number, etc., which is not limited in this embodiment of the present invention.

403. The server, when receiving the image clip information, determines multimedia program information matching the image clip information according to the image clip information, and acquires interaction information corresponding to the multimedia program information, the interaction information being vote information including multiple candidate options.

In the embodiment of the present invention, the image clip information acquired by the terminal device includes vote-related content, for example, the image clip information may include a keyword "vote" and names, pictures, numbers and the like of various candidate options, for example, image clip information in a singer contest program may include a keyword "vote" and pictures and numbers of various candidate singers. In addition, when the clip information acquired by the terminal device is video clip information, the video clip information may also include a keyword "vote" and names, pictures, numbers and the like of various candidate options, and when the clip information acquired by the terminal device is audio clip information, the audio clip information may include broadcast "vote" as well as names of multiple candidate options, and one clip of audio of each candidate option and the like. For example, audio information in a singer contest program may include broadcast "vote" and names and songs of various candidate singers.

In the embodiment of the present invention, the server stores interaction information corresponding to the multimedia program information, and the interaction information may be set by the server according to the multimedia program, or set according to an interactive activity currently initiated. The multimedia program information includes the name, maker, broadcast time and other information of the multimedia program, which is not limited in the embodiment of the present invention.

Specifically, for each multimedia program, the server takes a screen shot of the multimedia program, to obtain a plurality of image information, acquires interaction information corresponding to the multimedia program information, and correspondingly stores the multimedia program information, the plurality of image information and the interaction information. The server can take a screenshot of the multimedia program according to a specified frequency, to obtain a plurality of image information.

Further, the server identifies each obtained image information, acquires key picture, keyword, key string and other information included in each image information, determines interaction information corresponding to each image information according to the key picture, keyword, key string and other information included in each image information, and correspondingly stores the image information, the key picture, keyword, key string and other information included in the image information and the interaction information. The key picture may be human face pictures, two-dimensional code pictures and the like appearing in the image information, the keyword may be text appearing in the image information, and the key string may be a numeric string or English words and the like appearing in the image information.

By taking the vote information in the embodiment of the present invention as an example, when the server acquires the keyword "vote" and acquires a plurality of human face pictures after identifying the image information, interaction information corresponding to the image information is determined as vote information including candidates corresponding to the plurality of human face pictures.

Correspondingly, step 403 may include the following step 403a:

403a. The server, when receiving the image clip information, traverses each stored image information, determines the image information matching the image clip information, determines multimedia program information of the matched image information, and acquires interaction information corresponding to the multimedia program information.

For each stored image information, the server judges whether the image information matches the image clip information through image recognition, determines that the image information matches the image clip information when the image information is the same as the image clip information, or determines that the image information matches the image clip information when similarity between the image information and the image clip information exceeds a first specified threshold. At this time, the server determines multimedia program information of the image information, acquires interaction information corresponding to the multimedia program information, and returns the interaction information to the terminal device. The first specified threshold can be set by a technician during development, which is not limited in the embodiment of the present invention.

Further, for each stored image information, when the server stores the key picture, keyword, key string and other information included in the image information, the server identifies the clip information, to acquire clip picture, clip keyword or clip key string and other information included in the clip information, when any one of the key picture, keyword, key string and other information included in the image information is the same as any one of the clip picture, clip keyword or clip key string and other information included in the image clip information, it can be determined that the image information matches the image clip information, or, when all the key picture, keyword, key string and other information included in the image information are the same as the clip picture, clip keyword or clip key string and other information included in the image clip information, it is determined that the image information matches the image clip information.

For example, for each image information stored by the server, the server obtains keywords included in the image information previously through keyword recognition. When receiving the image clip information, the server identifies the image clip information and obtains names of candidate singers, and the server judges whether the keywords included in the image information include the names of the candidate singers, if yes, determines that the image information matches the image clip information, and if no, determines that the image information does not match the image clip information.

In addition, the server may also respectively store interaction information corresponding to each video information and interaction information corresponding to each audio information, specifically, the server takes a screenshot of each multimedia program, obtains a plurality of video information, acquires interaction information corresponding to the multimedia program information, and correspondingly stores the multimedia program, the plurality of video information and the interaction information. The server takes a screenshot of each multimedia program, obtains a plurality of audio information, acquires interaction information corresponding to the multimedia program information, and correspondingly stores the multimedia program, the plurality of audio information and the interaction information. The server takes a screenshot of video information and audio information of the multimedia program according to a first specified duration, and obtains a plurality of video information and a plurality of audio information, and durations of each video information and each audio information are the first specified duration.

Further, the server identifies each obtained video information, acquires key picture, keyword, key string or key audio feature and other information included in each video information, acquires interaction information corresponding to each video information according to the key picture, keyword, key string or key audio feature and other information included in each video information, and correspondingly stores the video information, the key picture, keyword, key string or key audio feature and other information included in the video information and the interaction information. The keyword may be text displayed in the video information or broadcast text, and the key audio feature may be an Eigen value obtained after the server performs voice recognition on audio of the video information.

In addition, the server identifies each obtained audio information, acquires keyword, key audio feature and other information included in each audio information, acquires interaction information corresponding to each audio information according to the keyword, key audio feature and other information included in each audio information, and correspondingly stores the audio information, the keyword, key audio feature and other information included in the audio information and the interaction information. The keyword may be text broadcast in the audio information, and the key audio feature may be an eigenvalue obtained after the server performs voice recognition on the audio information.

By taking the vote information in the embodiment of the present invention as an example, when the server, after identifying the audio information, acquires the broadcast keyword "vote" and acquires songs sung by a plurality of singers, it is determined that the interaction information is vote information including the plurality of singers.

Correspondingly, step 403 can be replaced by any one of the following steps 403b to 403d:

403b. The server, when receiving the audio clip information, traverses each audio information stored, determines audio information matching the audio clip information, determines multimedia program information of the matched audio information, and acquires interaction information corresponding to the multimedia program information.

For each audio information stored, the server judges whether the audio information matches the audio clip information through voice recognition, and determines that the audio information matches the audio clip information when the audio information is the same as the audio clip information, or determines that the audio information matches the audio clip information when the audio information when duration of the audio information and the same audio information in the audio clip information exceeds a second specified threshold. At this time, the server acquires interaction information corresponding to the audio information as interaction information corresponding to the audio clip information, and returns the interaction information to the terminal device. The second specified threshold can be set by a technician during development, which is not limited in the embodiment of the present invention.

Further, for each stored audio information, when the server stores keyword, key audio feature and other information included in the audio information, the server identifies the audio clip information, to acquire clip keyword, clip key audio feature and other information included in the audio clip information, when any one of the keyword, key audio feature and other information included in the audio information is the same as any one of the clip keyword, clip key audio feature and other information included in the audio clip information, it can be determined that the audio information matches the audio clip information, or, when all the keyword, key audio feature and other information included in the audio information are the same as the clip keyword, clip key audio feature and other information included in the audio clip information, itis determined that the audio information matches the audio clip information.

For example, for each audio information stored by the server, the server obtains keywords included in the audio information previously through voice recognition. When receiving the audio clip information, the server identifies the audio clip information and obtains names of candidate singers, and the server judges whether the keywords included in the audio information include the names of the candidate singers, if yes, determines that the audio information matches the audio clip information, and if no, determines that the audio information does not match the audio clip information.

403c. The server, when receiving the video clip information, traverses each video information stored, determines video information matching the video clip information, determines multimedia program information of the matched video information, and acquires interaction information corresponding to the multimedia program information.

The video information includes image information and audio information, and the server can determine video information matching the video clip information in manners similar to steps 403a and 403b, which is not repeated herein.

403d. When receiving the clip information and determining that the clip information includes multimedia program information, the server acquires interaction information corresponding to the multimedia program information according to the multimedia program information.

During actual applications, the playback device, when playing back the multimedia program, may display the multimedia program information in a lower-left corner or another region of the display screen or broadcasting the multimedia program information in played audio, and clip information acquired by the terminal device includes the multimedia program information; when receiving the clip information, the server determines a matched multimedia program according to the multimedia program information, and interaction information corresponding to the multimedia program information can be acquired.

For example, when playing back Episode 10 of the TV play "A Dream in Red Mansions", the playback device will display "A Dream in Red Mansions 10" in a lower-left corner of the display screen, image clip information obtained by the terminal device by scanning the display screen includes "A Dream in Red Mansions 10", and when receiving the image clip information, the server acquires interaction information corresponding to the multimedia program "A Dream in Red Mansions 10".

It should be noted that, in the embodiment of the present invention, the server acquires interaction information corresponding to the image clip information and sends the interaction information to the terminal device, and when receiving the interaction information, the terminal device generates an interactive interface at least including the interaction information according to the interaction information, and outputs the generated interactive interface. During actual applications, it is also feasible that the server previously generates an interactive interface at least including the interaction information according to the interaction information, the server, when receiving the image clip information, can directly acquire an interactive interface corresponding to the image clip information and sends the interactive interface to the terminal device, and the terminal device, when receiving the interactive interface, directly outputs the interactive interface, which is not limited in the embodiment of the present invention.

404. The server sends the interaction information to the terminal device.

405. The terminal device, when receiving the interaction information, outputs a vote interface at least including the multiple candidate options.

The interaction information may be vote information including the multiple candidate options, or may be a webpage link address used for determining vote information including the multiple candidate options, and the terminal device, when receiving the webpage link address, jumps to the webpage link address, and displays a vote interface at least including the multiple candidate options.

During actual applications, the server can initiate a vote activity, to guide users to vote. When the image clip information acquired by the terminal device includes vote-related content, the interaction information acquired by the server may be vote information including multiple candidate options, the terminal device outputs a vote interface at least including the multiple candidate options when receiving the interaction information, and the users can select a candidate option on the vote interface according to personal opinions, to vote for the selected candidate option.

In addition, the vote interface may further include data of each candidate option, name of the vote activity, organizer of the vote activity and other information, which is not limited in the embodiment of the present invention. The vote interface may be an H5 Hyper Text Markup language 5) page or another form of pages, which is not limited in the embodiment of the present invention.

It should be noted that, the embodiment of the present invention takes that the interaction information is vote information including multiple candidate options as an example, the terminal device outputs the vote interface, however, actually, the interaction information may also be information in other interactive forms, for example, interactive quiz information, answer information and the like, and the terminal device, when receiving the interaction information, outputs an interactive interface in a corresponding interactive form according to the interaction information. If the interaction information includes information in two or more interactive forms, the terminal device may output one interactive interface therein, or output a formal selection interface, a user selects a desired interactive form in the formal selection interface, and the terminal device outputs a corresponding interactive interface according to the interactive form selected by the user.

406. The terminal device, when detecting a user's selection operation on a specified candidate option in the vote interface, sends the specified candidate option to the server.

The embodiment of the present invention takes a specified candidate option in the multiple candidate options as an example, the terminal device, when detecting a user's selection operation on the specified candidate option, sends the specified candidate option to the server, and the server, when receiving the specified candidate option, increases the number of votes for the specified candidate option.

Figure 4E:
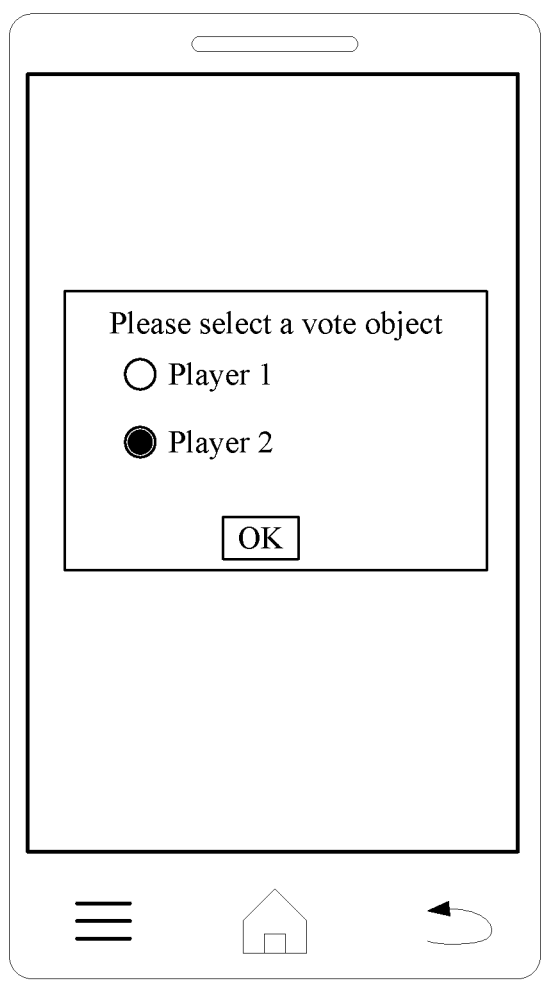
FIG. 4E is a schematic diagram of a vote interface according to one embodiment of the present invention.

Referring to FIG. 4E, the vote interface includes two candidate option, i.e., "Player 1" and "Player 2", and an "OK" key, when the terminal device detects a click operation on the "OK" key after a user selects "Player 2", it indicates that the user votes for the "Player 2", and when the terminal device sends the option of "Player 2" to the server, the server increases 1 to the number of votes for "Player 2" when receiving the option of "Player 2" sent by the terminal device.

407. The server increases the number of votes for the specified candidate option when receiving the specified candidate option.

When the server receives the specified candidate option, it indicates that the user of the terminal device votes for the specified candidate option, and the server increases 1 to the number of votes for the specified candidate option.

Further, the server can determine a voting weight of each user ID according to levels of user IDs of each terminal device, the server, when receiving the specified candidate option sent by the terminal device based on an user ID, determines a voting weight of the user ID, and increases the number of votes for the specified candidate option according to the voting weight. For example, if the voting weight of the user ID is 2, the server increases 2 to the number of votes for the specified candidate option.

The embodiment of the present invention only takes one vote activity as an example, the server can determine that the user of the terminal device votes for the specified candidate option, however, during actual applications, the server may be carrying out a plurality of vote activities, each vote activity includes multiple candidate options, and different vote activities may include the same candidate options. At this time, the server may assign one vote ID and one database for each vote activity, one vote ID corresponds to multiple candidate options, the database is configured to count the number of votes for the multiple candidate options, the vote information including the multiple candidate options determined by the server according to the clip information further includes the vote ID, the terminal device can obtain the vote ID when receiving the interaction information, then the terminal device can send the vote ID to the server while sending the specified candidate option to the server, and the server, when receiving the vote ID, can first determine a vote activity in which the terminal device participates, and increase the number of votes for the specified candidate option in the vote activity in the database corresponding to the vote activity. The vote ID may be name of the vote activity or number of the vote activity or the like, which is not limited in the embodiment of the present invention.

For example, two vote activities that the server is carrying out are as shown in Table 1 below.

TABLE 1

| Vote ID | Candidate Option | | |
|---|---|---|---|
| Favorite Male Artist | Liu Dehua | Zhang Xueyou | Chen Yixun |
| Favorite Actor | Liu Dehua | Liang Chaowei | Zhang Jiahui |

The server, when receiving clip information sent by the terminal device, determines that interaction information corresponding to the clip information is vote information including three candidate options, i.e., "Liu Dehua", "Zhang Xueyou" and "Chen Yixun", and the vote ID of "Favorite Male Artist", sends the vote information to the terminal device, the server, when receiving the option of "Liu Dehua" and the vote ID of "Favorite Male Artist" sent by the terminal device, determines that the terminal device votes for the option of "Liu Dehua" in the vote activity of "Favorite Male Artist", and the server increases the number of votes for the option of "Liu Dehua" in the database corresponding to the vote activity of "Favorite Male Artist". In the vote process, the server will not increase the number of votes for the option of "Liu Dehua" in the vote activity of "Favorite Actor".

408. The server sends the number of votes for each candidate option currently counted to the terminal device.

In the embodiment of the present invention, the server counts the number of votes for each candidate option according to candidate options sent by each terminal device participating in voting, and the server, when receiving a specified candidate option sent by the terminal device, can send the number of votes for each candidate option currently counted to the terminal device, so that the terminal device displays the number of votes for each candidate option, to enable users to know a current voting result.

The terminal device, when sending the specified candidate option to the server, displays a voting result display option, the terminal device, when detecting a user's click operation on the voting result display option, sends a voting result request to the server, and the server, when receiving the voting result request, sends the number of votes for each candidate option currently counted to the terminal device.

Further, the server, when receiving a voting result request of one terminal device, judges whether the terminal device has the right to display a voting result, and, when determining that the terminal device has the right to display a voting result, sends the number of votes for each candidate option currently counted to the terminal device. The server can judge whether the terminal device has sent any candidate option when judging whether the terminal device has the right to display a voting result, that is, whether the terminal device has voted is judged. The server determines that the terminal device has the right to display a voting result when determining that the terminal device has sent any candidate option, while the server determines that the terminal device does not have the right to display a voting result when determining that the terminal device has not sent any candidate option. The server guides users who hope to see the voting result to vote by limiting the right to display the voting result.

It should be noted that, steps 408-409 are optional steps, the server may not perform step 408, perform step 408 after step 407, or perform step 408 when receiving the voting result request of the terminal device and determining that the terminal device has the right to display a voting result, and the embodiment of the present invention does no limit whether the server performs step 408 and the time when step 408 is performed.

409. The terminal device, when receiving the number of votes for each candidate option, displays the number of votes for each candidate option.

The terminal device generates a voting result display interface at least including the number of votes for each candidate option according to the number of votes for each candidate option, and outputs the voting result display interface, so that the user can see the number of votes for each candidate option.

Further, in the voting result display interface, the terminal device can display the number of votes for each candidate option in a digital form, or display the number of votes for each candidate option in a pie chart form, or display the number of votes for each candidate option in a histogram form. In addition, when displaying the number of votes for each candidate option, the terminal device can highlight the number of votes for the specified candidate option, and the embodiment of the present invention does not limit the display manner of the terminal device.

It should be noted that, the embodiment of the present invention is only described by taking an interaction process between the terminal device and the server as an example, and actually, the interaction process can be carried out by a plurality of servers in a server cluster and the terminal device. By taking that the terminal device votes through the IM application as an example, the server cluster includes a playback server, an IM server, an interaction information storage server and a vote server, the playback server and the playback device communicate with each other through a network connection, the playback server is configured to provide a multimedia program for the playback device, and the terminal device and the IM server communicate with each other through a network connection. The terminal device, when acquiring the image clip information, sends the image clip information to the IM server, the IM server, when receiving the image clip information, forwards the image clip information to the interaction information storage server, the interaction information storage server, when receiving the image clip information, acquires interaction information corresponding to the image clip information, that is, vote information including multiple candidate options, and returns the interaction information to the IM server, and the IM server, when receiving the interaction information, forwards the interaction information to the terminal device. In a subsequent process, the IM server, when receiving a specified candidate option sent by the terminal device, forwards the specified candidate option to the vote server, and the vote server, when receiving the specified candidate option, increases the number of votes for the specified candidate option. The embodiment of the present invention does not limit the plurality of servers in the server cluster.

The method in the embodiment of the present invention takes that the interaction information is vote information including multiple candidate options as an example, the playback device can guide users to participate in voting each time the playback device plays back the multimedia program, thereby prolonging effective time of the voting, and the users can participate in the voting only by selecting a candidate option on the vote interface, which is easy to operate, improves interaction efficiency, increases the number of users participating in interaction, and enhances user viscosity.

Figure 5A:
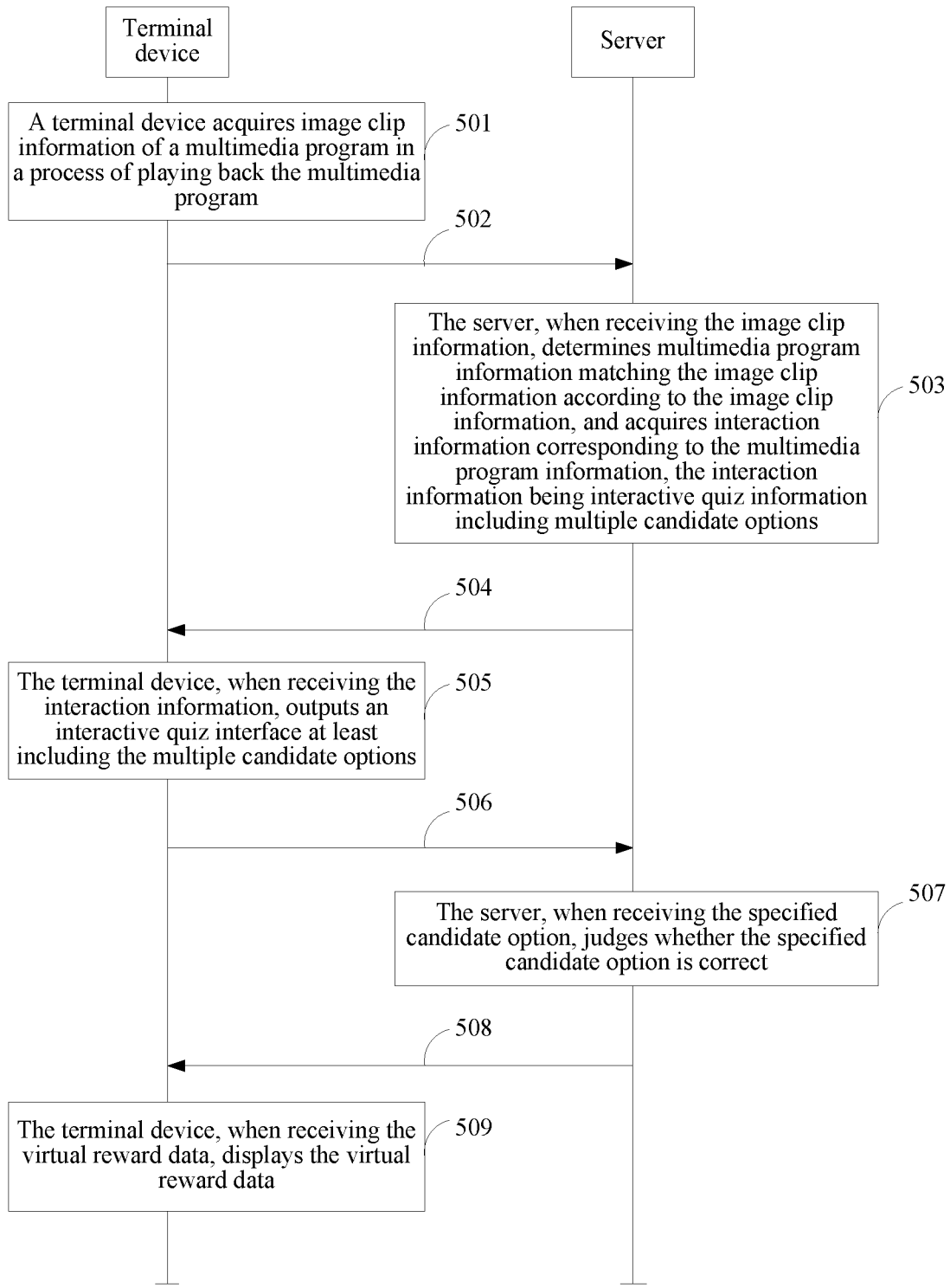
FIG. 5A is a flowchart of an interaction method based on multimedia programs according to one embodiment of the present invention.

FIG. 5A is a flowchart of an interaction method based on multimedia programs according to one embodiment of the present invention. Interaction bodies in the embodiment of the present invention are a terminal device and a server; for ease of description, the embodiment of the present invention takes that the image clip information includes interactive quiz-related content as an example, and interaction information corresponding to the image clip information is interactive quiz information including multiple candidate options; referring to FIG. 5A, the method includes:

501. A terminal device acquires image clip information of a multimedia program in a process of playing back the multimedia program.

502. The terminal device sends the image clip information to the server.

Steps 501-502 are similar to steps 401-402, and are not repeated herein.

503. The server, when receiving the image clip information, determines multimedia program information matching the image clip information according to the image clip information, and acquires interaction information corresponding to the multimedia program information, the interaction information being interactive quiz information including multiple candidate options.

During actual applications, the server can acquire video streaming of an ongoing game from a TV station and send the video streaming to the playback device, the playback device plays back the video streaming when receiving the video streaming, and the terminal device can play back the game in a form of live Internet broadcasts. During playback, users cannot know a game result, the server can set an interactive quiz activity for the game, to guide the users to interactive quiz the game result, the clip information includes content related to game result interactive quiz, and interaction information corresponding to the game is interactive quiz information.

The image clip information may include a keyword "interactive quiz" and names, numbers or flag pictures or the like of both game players, for example, the server, when identifying the image clip information and acquiring the keyword "interactive quiz" and the names of two players, determines that interaction information corresponding to the image clip information is interactive quiz information including the names of the two players. In addition, when the terminal device acquires audio clip information, the audio clip information may include broadcast "interactive quiz" and names or numbers of both game players or the like. For example, the server, when identifying the audio clip information and acquiring the keyword "interactive quiz" and the names of two players, determines that interaction information corresponding to the audio clip information is interactive quiz information including the names of the two players.

504. The server sends the interaction information to the terminal device.

505. The terminal device, when receiving the interaction information, outputs an interactive quiz interface at least including the multiple candidate options.

The interaction information acquired by the server may be interactive quiz information including multiple candidate options, the terminal device, when receiving the interaction information, outputs an interactive quiz interface at least including the multiple candidate options, and the users can select a predicted candidate option in the interactive quiz interface. In addition, the interactive quiz interface may further include data of each candidate option, the amount of virtual reward data issued in the event of correct interactive quiz and other information, which is not limited in the embodiment of the present invention.

506. The terminal device, when detecting a user's selection operation on a specified candidate option in the interactive quiz interface, sends the specified candidate option to the server.

The embodiment of the present invention takes a specified candidate option in the multiple candidate options as an example, the terminal device, when detecting a user's selection operation on the specified candidate option, sends the specified candidate option to the server, and the server, when receiving the specified candidate option, judges whether the specified candidate option is correct after waiting for determining the interactive quiz result.

Figure 5B:
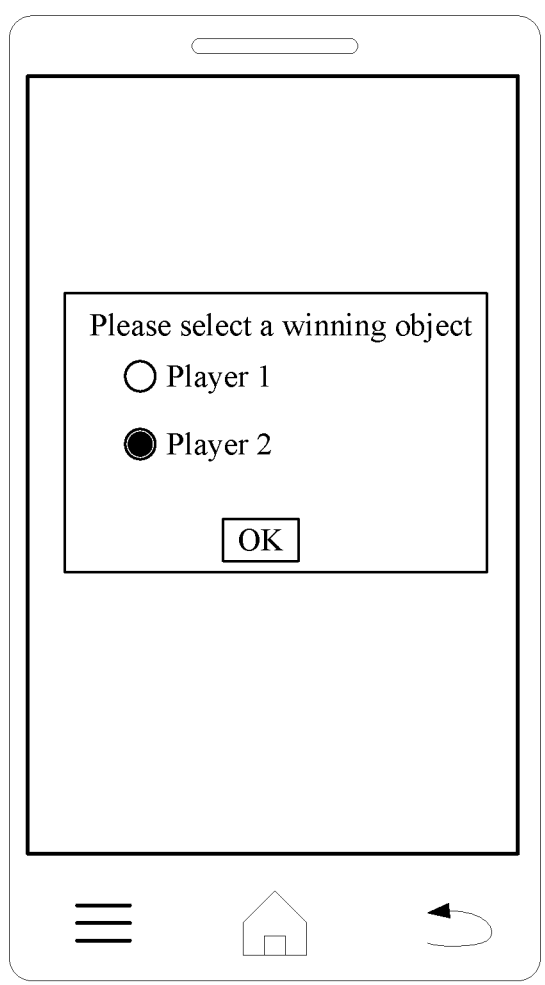
FIG. 5B is a schematic diagram of an interactive quiz interface according to one embodiment of the present invention.

Referring to FIG. 5B, the interactive quiz interface includes two candidate options, i.e., "Player 1" and "Player 2", and an "OK" key, when the terminal device detects a click operation on the "OK" key after a user selects "Player 2", it indicates that the user predicts that "Player 2" will win, the terminal device sends the option of "Player 2" to the server, and the server receives the option of "Player 2" sent by the terminal device.

507. The server, when receiving the specified candidate option, judges whether the specified candidate option is correct.

When the server receives the specified candidate option, if a game result has not yet been generated, the server records the specified candidate option, waits for generation of the game result, and judges whether the specified candidate option is correct when the game result is generated.

During actual applications, the server records candidate options sent by each terminal device, waits for generation of a game result, and judges whether the candidate options sent by each terminal device are correct when the game result is generated.

It should be noted that, the embodiment of the present invention takes one interactive quiz activity as an example, the server, when receiving the specified candidate option, determines that the user of the terminal device predicts that the specified candidate option will win, however, during actual application, the server may be carrying out a plurality of interactive quiz activities, each interactive quiz activity includes multiple candidate options, and different interactive quiz activities may include the same candidate options. At this time, the server may assign one interactive quiz ID and one database for each interactive quiz activity, one interactive quiz ID corresponds to multiple candidate options, the database is configured to count the number of terminal devices sending the multiple candidate options, interactive quiz information including the multiple candidate options determined by the server according to the clip information further includes the interactive quiz ID, the terminal device can obtain the interactive quiz ID when receiving the interaction information, then the terminal device can send the interactive quiz ID to the server while sending the specified candidate option to the server, and the server, when receiving the interactive quiz ID, can first determine an interactive quiz activity in which the terminal device participates, and then judges whether the specified candidate option is correct. The interactive quiz ID may be name of the interactive quiz activity or number of the interactive quiz activity or the like, which is not limited in the embodiment of the present invention.

For example, two interactive quiz activities that the server is carrying out are "Predict champion of the World Cup for the first team" and "Predict World Cup championship", the server, when receiving an option of "Team Great Britain" and "Predict champion of the World Cup for the first team" sent by the terminal device, records the option of "Team Great Britain" guessed by the terminal device in a database corresponding to the interactive quiz activity "Predict champion of the World Cup for the first team", when waiting for generation of a game result of the World Cup for the first team, judges according to the game result whether "Team Great Britain" predicted by the terminal device is the champion of the World Cup for the first team, if yes, determines that the terminal device guesses correctly, and if no, determines that the terminal device guesses incorrectly.

508. The server sends virtual reward data to the terminal device according to a judgment result.

When the specified candidate option is correct, the server sends an interactive quiz correct message to the terminal device, and at this time, the server can send a certain amount of virtual reward data to the terminal device. When the specified candidate option is incorrect, the server sends an interactive quiz incorrect message to the terminal device, and at this time, the server cannot send virtual reward data to the terminal device or sends a less amount of virtual reward data to the terminal device. The amount of the virtual reward data is pre-determined by the server, or determined by the server according to levels of user IDs of the terminal device, which is not limited in the embodiment of the present invention.

Based on the example in step 505, when "Player 1" wins, the server sends an interactive quiz incorrect message to the terminal device, and when "Player 2" wins, the server sends an interactive quiz correct message and a certain amount of virtual reward data to the terminal device.

509. The terminal device, when receiving the virtual reward data, displays the virtual reward data.

The method in the embodiment of the present invention takes that the interaction information is interactive quiz information including multiple candidate options as an example, the playback device can guide users to participate in interactive quiz each time the playback device plays back the multimedia program, thereby prolonging effective time of the interactive quiz, and the users can participate in the interactive quiz only by selecting a candidate option on the interactive quiz interface, which is easy to operate, improves interaction efficiency, increases the number of users participating in interaction, and enhances user viscosity.

Figure 6A:
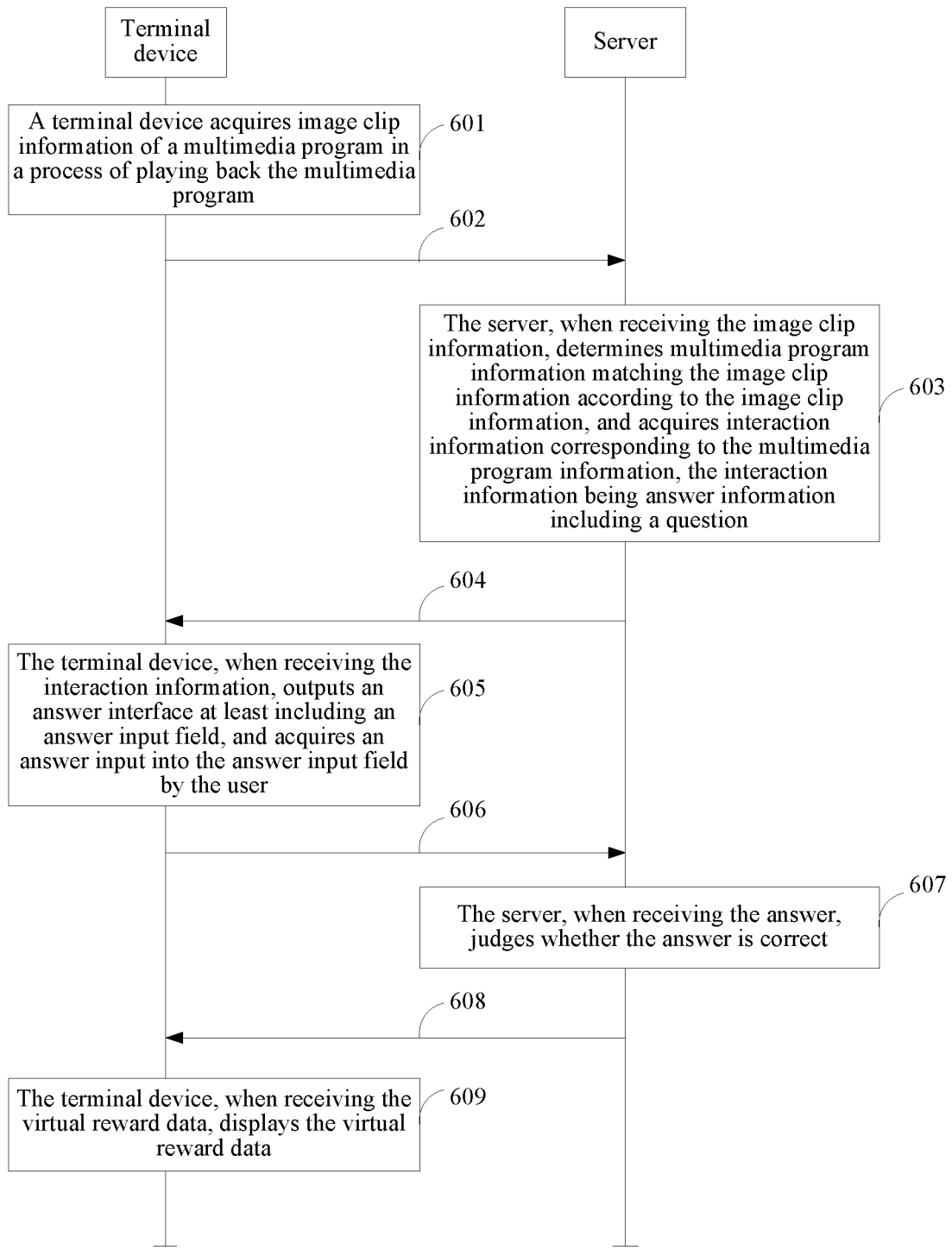
FIG. 6A is a flowchart of an interaction method based on multimedia programs according to one embodiment of the present invention.

FIG. 6A is a flowchart of an interaction method based on multimedia programs according to one embodiment of the present invention. Interaction bodies in the embodiment of the present invention are a terminal device and a server; for ease of description, the embodiment of the present invention takes that the image clip information includes answer-related content as an example, and interaction information corresponding to the image clip information is answer information including a question; referring to FIG. 6A, the method includes:

601. A terminal device acquires image clip information of a multimedia program in a process of playing back the multimedia program.

602. The terminal device sends the image clip information to the server.

Steps 601-602 are similar to steps 401-402, and are not repeated herein.

603. The server, when receiving the image clip information, determines multimedia program information matching the image clip information according to the image clip information, and acquires interaction information corresponding to the multimedia program information, the interaction information being answer information including a question.

When the image clip information includes answer-related content, interaction information corresponding to the image clip information is answer information including a question. The image clip information may include keywords such as "ask a question", "excuse me" or "please answer" and corresponding questions, for example, the image clip information includes "please answer the name of the Chinese film that won an Oscar for the best foreign language film", the server identifies the image clip information, to acquire the keyword "please answer", and determines that the question is "the name of the Chinese film that won an Oscar for the best foreign language film", and the interaction information is answer information including the question "the name of the Chinese film that won an Oscar for the best foreign language film".

604. The server sends the interaction information to the terminal device.

605. The terminal device, when receiving the interaction information, outputs an answer interface at least including an answer input field, and acquires an answer input into the answer input field by the user.

The interaction information acquired by the server is answer information including a question, the terminal device, when receiving the interaction information, outputs an answer interface at least including an answer input field, the user can input an answer to the question into the answer input field of the answer interface, and the terminal device acquires the answer.

During actual application, the terminal device, when playing back the image clip information, will play back a question to be answered, the user can obtain the question, and the answer interface output by the terminal device may include the question or may not include the question, which is not limited in the embodiment of the present invention. Certainly, the answer interface may further include the amount of virtual reward data issued when the answer is correct and other information, which is not limited in the embodiment of the present invention.

Figure 6B:
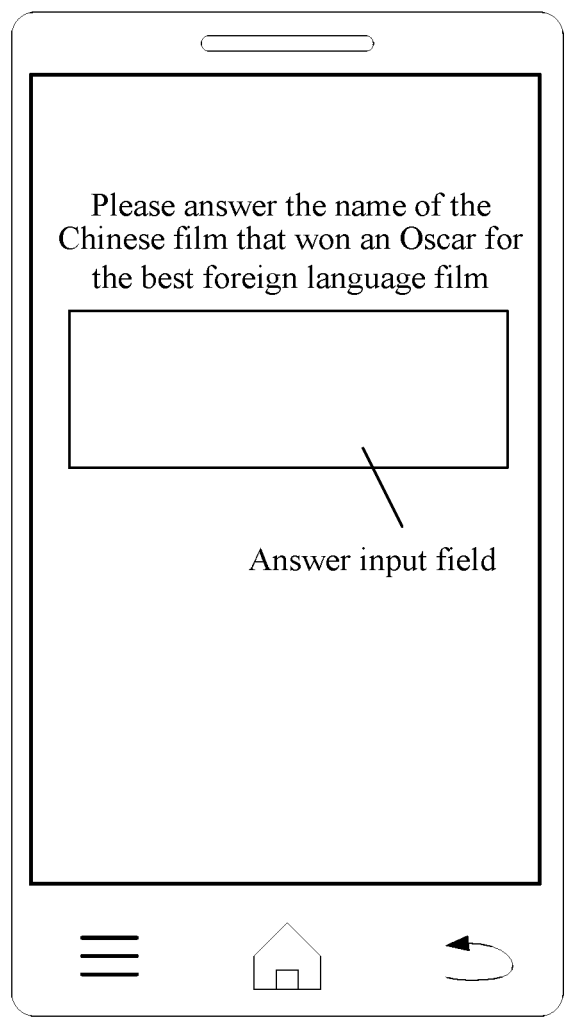
FIG. 6B is a schematic diagram of an answer interface according to one embodiment of the present invention.

Referring to FIG. 6B, the answer interface includes a question "please answer the name of the Chinese film that won an Oscar for the best foreign language film" and an answer input field, the terminal device, when acquiring an answer input into the answer input field by the user, sends the answer to the server, and the server receives the answer.

It should be noted that, the embodiment of the present invention takes that the user inputs an answer in the answer input field as an example, actually, when the answer is a choice question, the interaction information is answer information including multiple candidate options, at this time, the terminal device outputs an answer interface at least including the multiple candidate options, and the user can select one candidate option in the answer interface as the user's answer. The execution process when the interaction information is answer information including multiple candidate options is similar to the execution process when the interaction information is interactive quiz information including multiple candidate options, which is not repeated herein.

Figure 6C:
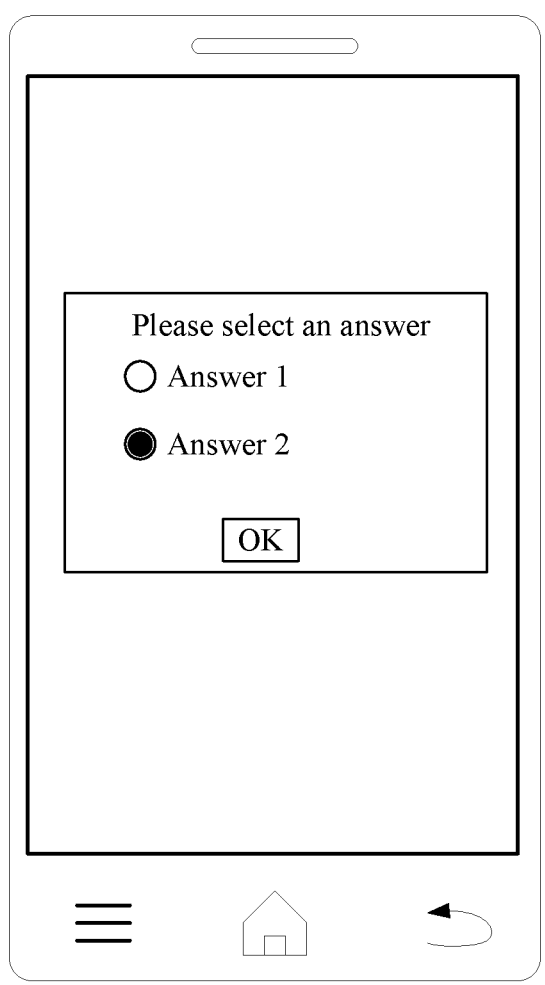
FIG. 6C is a schematic diagram of another answer interface according to one embodiment of the present invention.

Referring to FIG. 6C, the answer interface includes two candidate options, i.e., "Answer 1" and "Answer 2", and an "OK" key, the terminal device, when detecting a click operation on the "OK" key after a user selects "Answer 2", sends the option of "Answer 2" to the server, and the server receives the option of "Answer 2".

606. The terminal device sends the answer to the server.

607. The server, when receiving the answer, judges whether the answer is correct.

608. The server sends virtual reward data to the terminal device according to a judgment result.

609. The terminal device, when receiving the virtual reward data, displays the virtual reward data.

Steps 606-609 are similar to steps 506-509, and are not repeated herein.

The method in the embodiment of the present invention takes that the interaction information is answer information including a question as an example, the playback device can guide users to participate in answering a question each time the playback device plays back the multimedia program, thereby prolonging effective time of answering the question, and the users can participate in answering the question only by selecting a candidate option on the answer interface, which is easy to operate, improves interaction efficiency, increases the number of users participating in interaction, and enhances user viscosity.

Figure 7A:
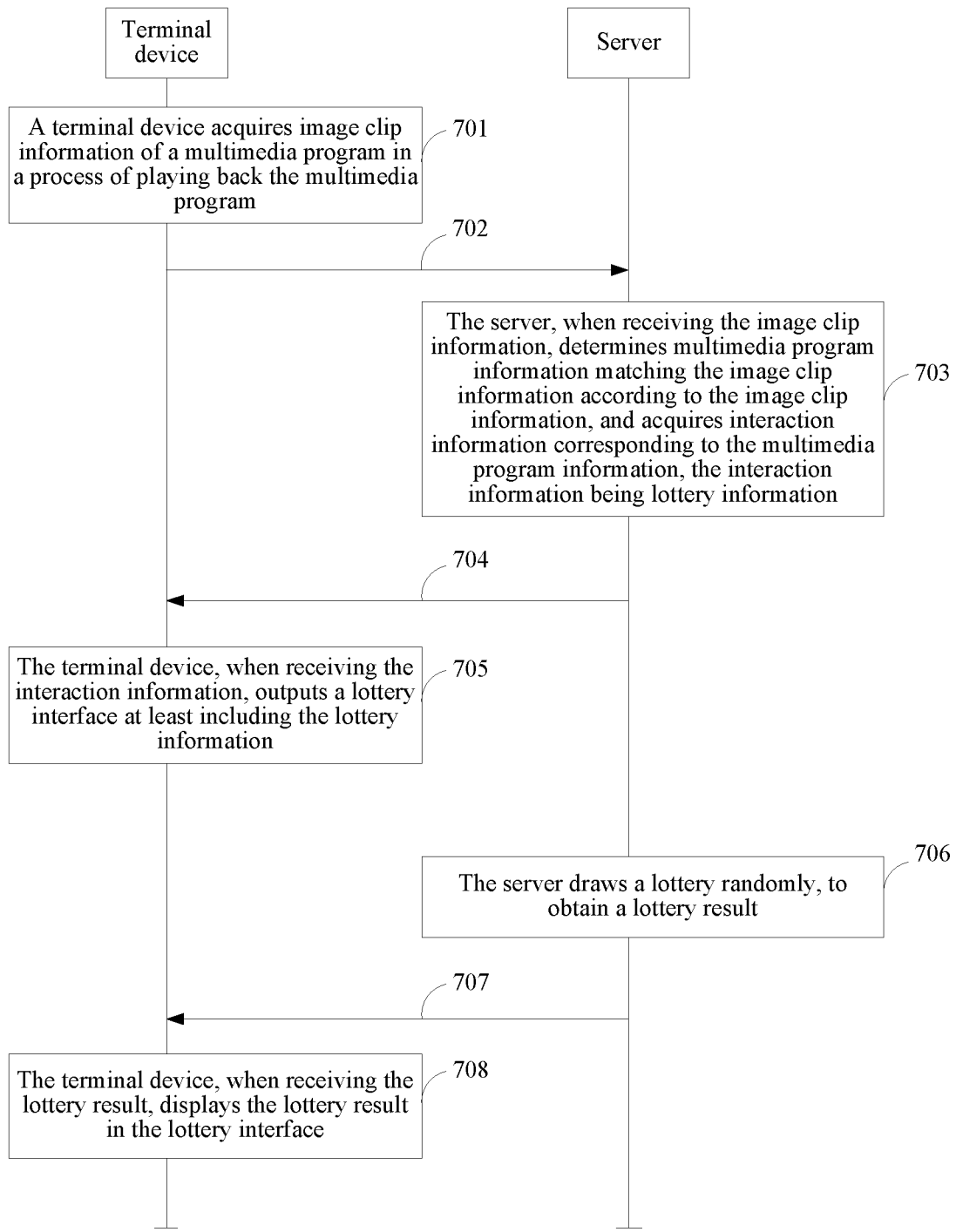
FIG. 7A is a flowchart of an interaction method based on multimedia programs according to one embodiment of the present invention.

FIG. 7A is a flowchart of an interaction method based on multimedia programs according to one embodiment of the present invention. Interaction bodies in the embodiment of the present invention are a terminal device and a server; for ease of description, the embodiment of the present invention takes that the image clip information includes lottery-related content as an example, and interaction information corresponding to the image clip information is lottery information; referring to FIG. 7A, the method includes:

701. A terminal device acquires image clip information of a multimedia program in a process of playing back the multimedia program.

702. The terminal device sends the image clip information to the server.

Steps 701-702 are similar to steps 401-402, and are not repeated herein.

703. The server, when receiving the image clip information, determines multimedia program information matching the image clip information according to the image clip information, and acquires interaction information corresponding to the multimedia program information, the interaction information being lottery information.

When the image clip information includes lottery-related content, interaction information corresponding to the image clip information is lottery information. The lottery information may be name of a lottery activity organizer, introduction to the virtual reward data and the like, which is not limited to the embodiment of the present invention. The image clip information may include a keyword "lottery" and the name of a lottery activity, and the server, when identifying the image clip information and acquiring the keyword "lottery" and the name of the lottery activity, determines that the interaction information is lottery information corresponding to the name.

704. The server sends the interaction information to the terminal device, and step 706 is performed.

705. The terminal device, when receiving the interaction information, outputs a lottery interface at least including the lottery information.

The interaction information acquired by the server is lottery information, and the terminal device, when receiving the interaction information, outputs a lottery interface at least including the lottery information, to prompt a user that the server is drawing a lottery. The lottery interface may include a lottery waiting message or other information, which is not limited in the embodiment of the present invention.

706. The server draws a lottery randomly, to obtain a lottery result.

The server pre-determines a plurality of virtual reward data, randomly assigns one virtual reward data to the terminal device, and takes the assigned virtual reward data as a lottery result of the terminal device to be returned to the terminal device. The server may also encapsulate the plurality of virtual reward data into a form of a lottery card, and sends the encapsulated virtual reward data to the terminal device, the terminal device displays the plurality of lottery cards, the terminal device, when detecting a user's click operation on a specified lottery card, sends the specified lottery card to the server, and the server, when receiving the specified lottery card, determines virtual reward data in the specified lottery card, and takes the virtual reward data as a lottery result of the terminal device.

Figure 7B:
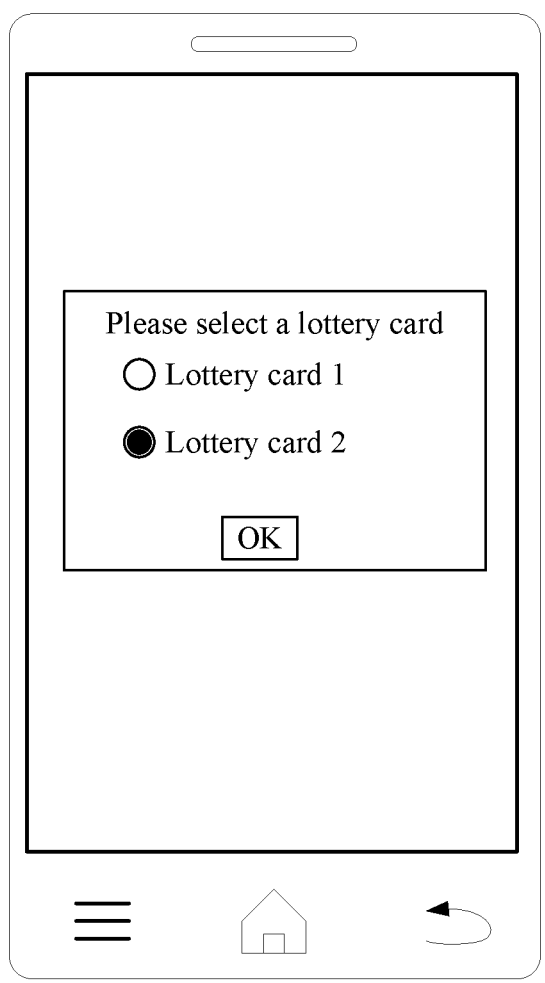
FIG. 7B is a schematic diagram of a lottery interface according to one embodiment of the present invention.

Referring to FIG. 7B, the lottery interface includes two lottery card options, i.e., "Lottery card 1" and "Lottery card 2", and an "Kooky, the terminal device, when detecting a click operation on the "Kooky after a user selects "Lottery card 2", sends the option of "Lottery card 2" to the server, and the server receives the option of "Lottery card 2", and takes virtual reward data in the Lottery card 2 as a lottery result of the terminal device.

In addition, the lottery interface may further include the amount of virtual reward data corresponding to each lottery option or other information, which is not limited in the embodiment of the present invention.

It should be noted that, the embodiment of the present invention takes that step 706 is performed after step 704 as an example, actually, step 706 may be performed simultaneously with step 704, or step 706 is performed after step 704 has been performed after a second specified duration, and the second specified duration may be determined by the server according to a current network condition, which is not limited in the embodiment of the present invention.

707. The server sends the lottery result to the terminal device.

708. The terminal device, when receiving the lottery result, displays the lottery result in the lottery interface.

The method in the embodiment of the present invention takes that the interaction information is answer information including a question as an example, the playback device can guide users to participate in answering a question each time the playback device plays back the multimedia program, thereby prolonging effective time of answering the question, and the users can participate in answering the question only by selecting a candidate option on the answer interface, which is easy to operate, improves interaction efficiency, increases the number of users participating in interaction, and enhances user viscosity.

Figure 8A:
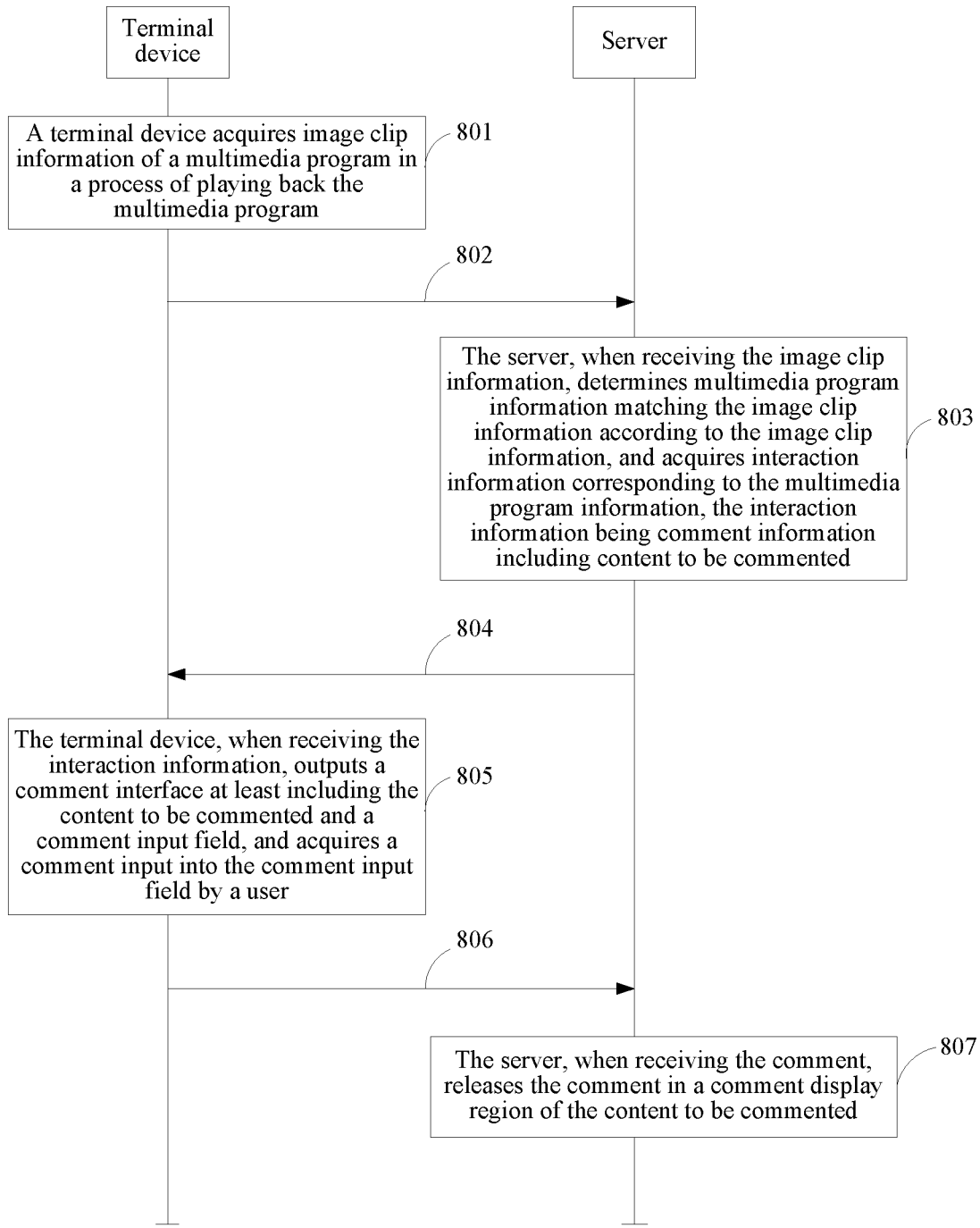
FIG. 8A is a flowchart of an interaction method based on multimedia programs according to one embodiment of the present invention.

FIG. 8A is a flowchart of an interaction method based on multimedia programs according to one embodiment of the present invention. Interaction bodies in the embodiment of the present invention are terminal device and a server; for ease of description, the embodiment of the present invention takes that interaction information corresponding tithe image clip information is comment information including content to be commented; referring to FIG. 8A, the method includes:

801. A terminal device acquires image clip information of multimedia program in a process of playing back the multimedia program.

802. The terminal device sends the image clip information to the server.

Steps 801-802 are similar to steps 401-402, and are not repeated herein.

803. The server, when receiving the image clip information, determines multimedia program information matching the image clip information according to the image clip information, and acquires interaction information corresponding to the multimedia program information, the interaction information being comment information including content to be commented.

The content to be commented may be the multimedia program, characters appearing in the image clip information, lines appearing in the image clip information and the like, and the content to be commented may be determined by the server according to the image clip information, which is not limited in the embodiment of the present invention. The image clip information may include a keyword "leave a message" or "comment" and corresponding content to be commented. For example, the image clip information includes "welcome to leave a message at Happy Camp's official Weibo", and the server identifies the image clip information, acquires the keyword "leave a message" and the corresponding content to be commented "Happy Camp", and determines that the interaction information is comment information including the content to be commented "Happy Camp".

804. The server sends the interaction information to the terminal device.

805. The terminal device, when receiving the interaction information, outputs a comment interface at least including the content to be commented and a comment input field, and acquires a comment input into the comment input field by a user.

The terminal device, when receiving the interaction information, outputs a comment interface at least including the content to be commented and a comment input field, and a user can browse the content to be commented in the comment interface, and inputs a comment upon the content to be commented in the comment input field. The comment interface may further include a release option, and the terminal device, after detecting a click operation on the release option after the user inputs a comment in the comment input field, acquires the comment and sends the comment to the server.

In addition, the interaction information may further include other users' comments of the content to be commented, the comment interface may include other users' comments of the content to be commented, a praise option corresponding to the comment and a reply option, the terminal device, when detecting a user's click operation on any reply option, displays a reply input field, and the user can input a reply to the comment corresponding to the reply option in the reply input field. When the terminal device detects the user's downward sliding operation in the process of displaying the comment interface, the comment interface can be refreshed.

806. The terminal device sends the comment to the server.

807. The server, when receiving the comment, releases the commenting a comment display region of the content to be commented.

The comment display region is used for displaying a user's comment upon the content to be commented, and can be located below or on the right of the content to be commented. The server, when receiving the comment, releases the comment as the terminal device in the comment display region, so that other users can browse or make a reply to the comment upon the user of the terminal device. The server, when receiving the comment, examines the comment, and after the examination is passed, releases the comment as the terminal device in the comment display region.

Figure 8B:
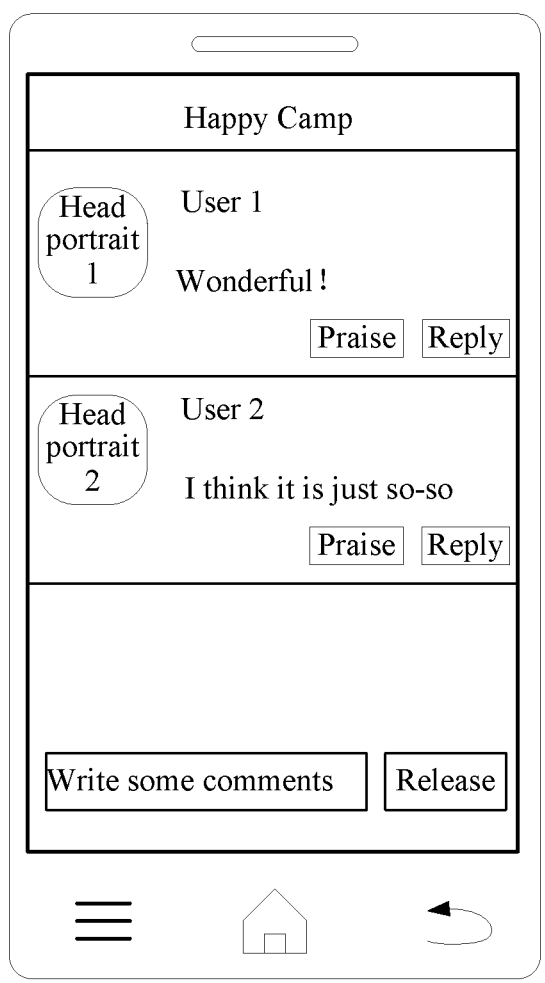
FIG. 8B is a schematic diagram of a comment interface according to one embodiment of the present invention.

Referring to FIG. 8B, the comment interface includes content to be commented "Happy Camp", a comment display region, a comment input field and a "release" option, the comment display region includes comments released by "User 1" and "User 2" and a "praise" option and a "reply" option corresponding to each comment, a user can click the "praise" option to praise the corresponding comment, or click the "reply" option to make a reply to the corresponding comment. The user can input a comment upon "Happy Camp" in the comment input field, and the terminal device, when detecting the user's click operation on the "release" option, acquires a comment in the comment input field, and sends the comment to the server, so that the server releases the comment in the comment display region.

The method in the embodiment of the present invention takes that the interaction information is comment information including content to be commented as an example, the playback device can guide users to participate in comments each time the playback device plays back the multimedia program, thereby prolonging effective time of the comments, and the users only need to input comments in the comment interface, which is easy to operate, improves interaction efficiency, increases the number of users participating in interaction, and enhances user viscosity.

Figure 9A:
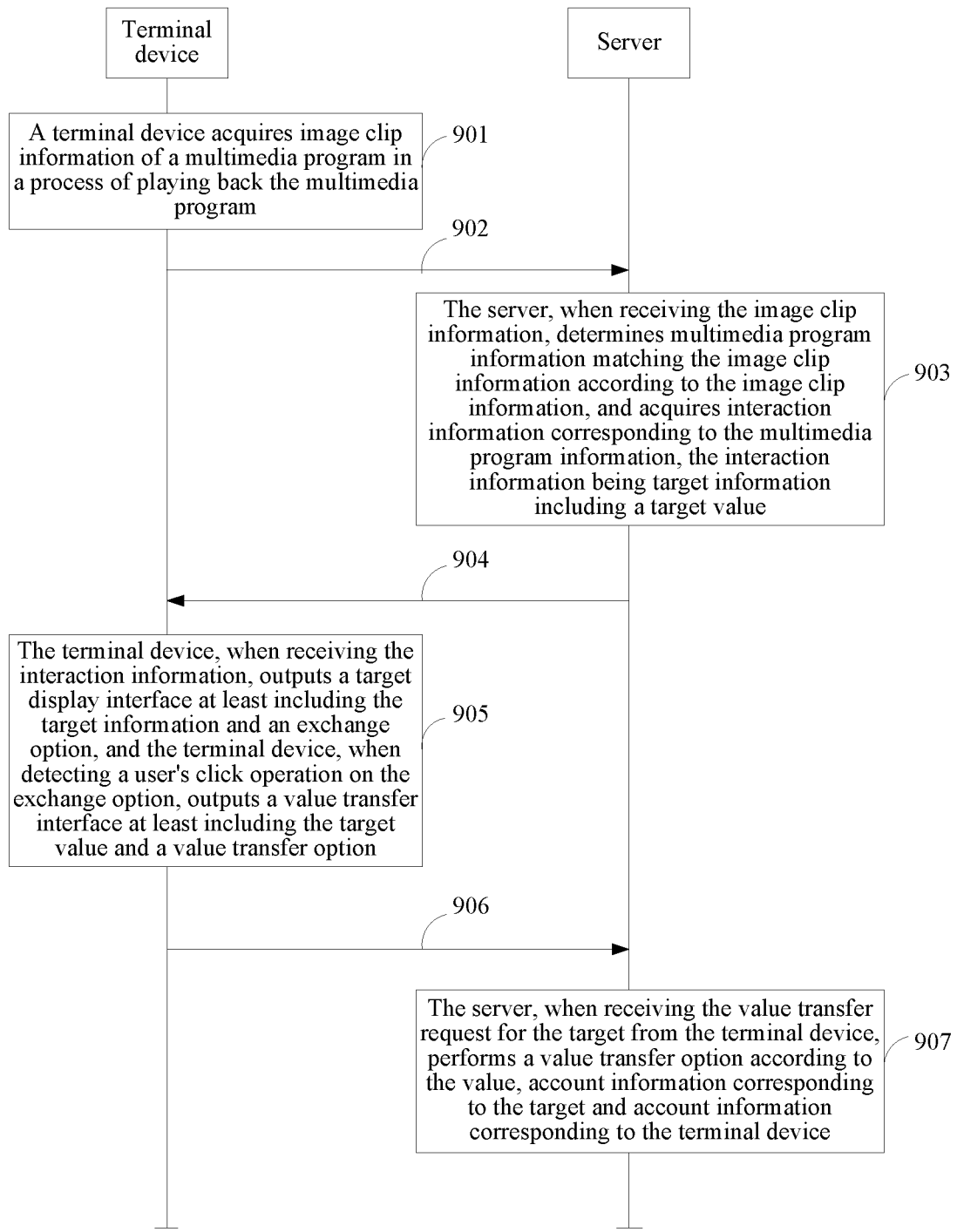
FIG. 9A is a flowchart of an interaction method based on multimedia programs according to one embodiment of the present invention.

FIG. 9A is a flowchart of an interaction method based on multimedia programs according to one embodiment of the present invention. Interaction bodies in the embodiment of the present invention are a terminal device and a server; for ease of description, the embodiment of the present invention takes that the image clip information includes exchange target-related content as an example, and interaction information corresponding to the image clip information is target information including a target value; referring to FIG. 9A, the method includes:

901. A terminal device acquires image clip information of multimedia program in a process of playing back the multimedia program.

902. The terminal device sends the image clip information to the server.

Steps 901-902 are similar to steps 401-402, and are not repeated herein.

903. The server, when receiving the image clip information, determines multimedia program information matching the image clip information according to the image clip information, and acquires interaction information corresponding to the multimedia program information, the interaction information being target information including a target value.

When the image clip information includes exchange target-related content, interaction information corresponding to the image clip information is target information including a target value. The image clip information may include a keyword "buy" and name and value of a corresponding target, for example, the image clip information includes "leather skinny windbreaker, only 159 Yuan, welcome to buy", the server, after identifying the image clip information, acquires the keyword "buy" and the corresponding target name "leather skinny windbreaker" and the value "159 Yuan", and determines that the interaction information corresponding to the image clip information is target information including the target value "159 Yuan".

904. The server sends the interaction information to the terminal device.

905. The terminal device, when receiving the interaction information, outputs a target display interface at least including the target information and an exchange option, and the terminal device, when detecting a user's click operation on the exchange option, outputs a value transfer interface at least including the target value and a value transfer option.

The interaction information acquired by the server is target information including a target value, and the terminal device, when receiving the interaction information, outputs a target display interface at least including the target information and an exchange option. The target information may also include the target's picture, name, special offers and the like, and a user can browse the target information in the target display interface.

When the user hopes to exchange the target for the target value, the user clicks the exchange option, and the terminal device, when detecting the user's click operation on the exchange option, outputs a value transfer interface at least including the target value and a value transfer option. Specifically, the terminal device, when detecting the user's click operation on the exchange option, sends an order request for the target to the server, and the server, when receiving the order request, generates an order of the target, the order including the target value, order number and other information. The server sends the order to the terminal device, and the terminal device, when receiving the order, outputs the value transfer interface at least including the target value and the value transfer option. Afterwards, the terminal device, when detecting the user's click operation on the value transfer option, sends a value transfer request for the target to the server.

Figure 9B:
FIG. 9B is a schematic diagram of a target display interface according to one embodiment of the present invention.
Figure 9C:
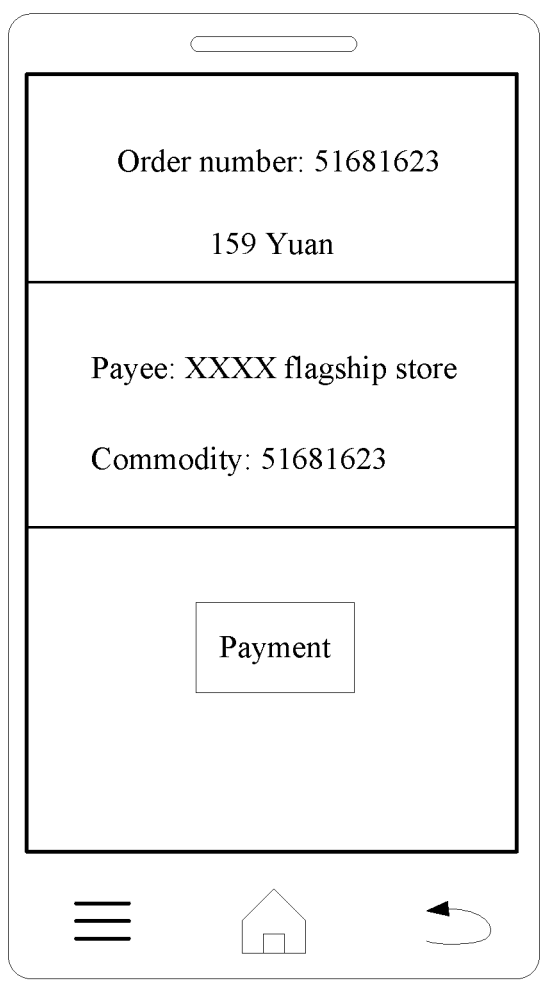
FIG. 9C is a schematic diagram of a value transfer interface according to one embodiment of the present invention.

Referring to FIG. 9B, the target display interface includes the target's picture "Picture 1", name "leather skinny windbreaker, value 159 Yuan", special offer "30% discount" and exchange option "buy", and the terminal device, when detecting the user's click operation on the option of "buy", displays a value transfer interface as shown in FIG. 9C. The value transfer interface includes an order number "51681623", the value "159 Yuan" and a value transfer option "payment", and the terminal device, when detecting the user's click operation on the option of "payment", sends a value transfer request for the target to the server, so that the server, when receiving the value transfer request, performs a value transfer operation.

It should be noted that, when the interaction information is target information including a target value, the terminal device first outputs the target display interface, and then outputs the value transfer interface when detecting the user's click operation on the exchange option, while, in another embodiment provided in the embodiment of the present invention, when the interaction information is value transfer information including the target value, the terminal device can directly output the value transfer interface, that is, the server, when receiving the image clip information, acquires the interaction information and directly generates an order according to the interaction information, which does not require the user to click the exchange option, simplifies the user's operation, and saves the time consumed by value transfer.

906. The terminal device, when detecting the user's click operation on the value transfer option, sends a value transfer request for the target to the server.

907. The server, when receiving the value transfer request for the target from the terminal device, performs a value transfer option according to the value, account information corresponding to the target and account information corresponding to the terminal device.

The server, when receiving the value transfer request for the target from the terminal device, acquires the value, account information corresponding to the target and account information corresponding to the terminal device, and transfers the value from the account information corresponding to the terminal device to the account information corresponding to the target, that is, the server decreases the value of the account information corresponding to the terminal device by the value and increases the value of the account information corresponding to the target by the value, to complete the value transfer operation on the target. The account information corresponding to the target can beeper-loaded by an owner of the target to the server, and the account information corresponding to the terminal device can be pre-bound by the terminal device, or sent to the server while the value transfer request is sent to the server, which is not limited in the embodiment of the present invention.

The method in the embodiment of the present invention takes that the interaction information is target information including a target value as an example, the playback device can guide users to browse the target information each time the playback device plays back the multimedia program, thereby prolonging effective time, the users can exchange the target for the target value only by clicking the exchange option on the target display interface, which is easy to operate, improves interaction efficiency, does not need to interrupt the process that the users watch the multimedia program, increases the number of users participating in interaction, and enhances user viscosity.

Figure 10A:
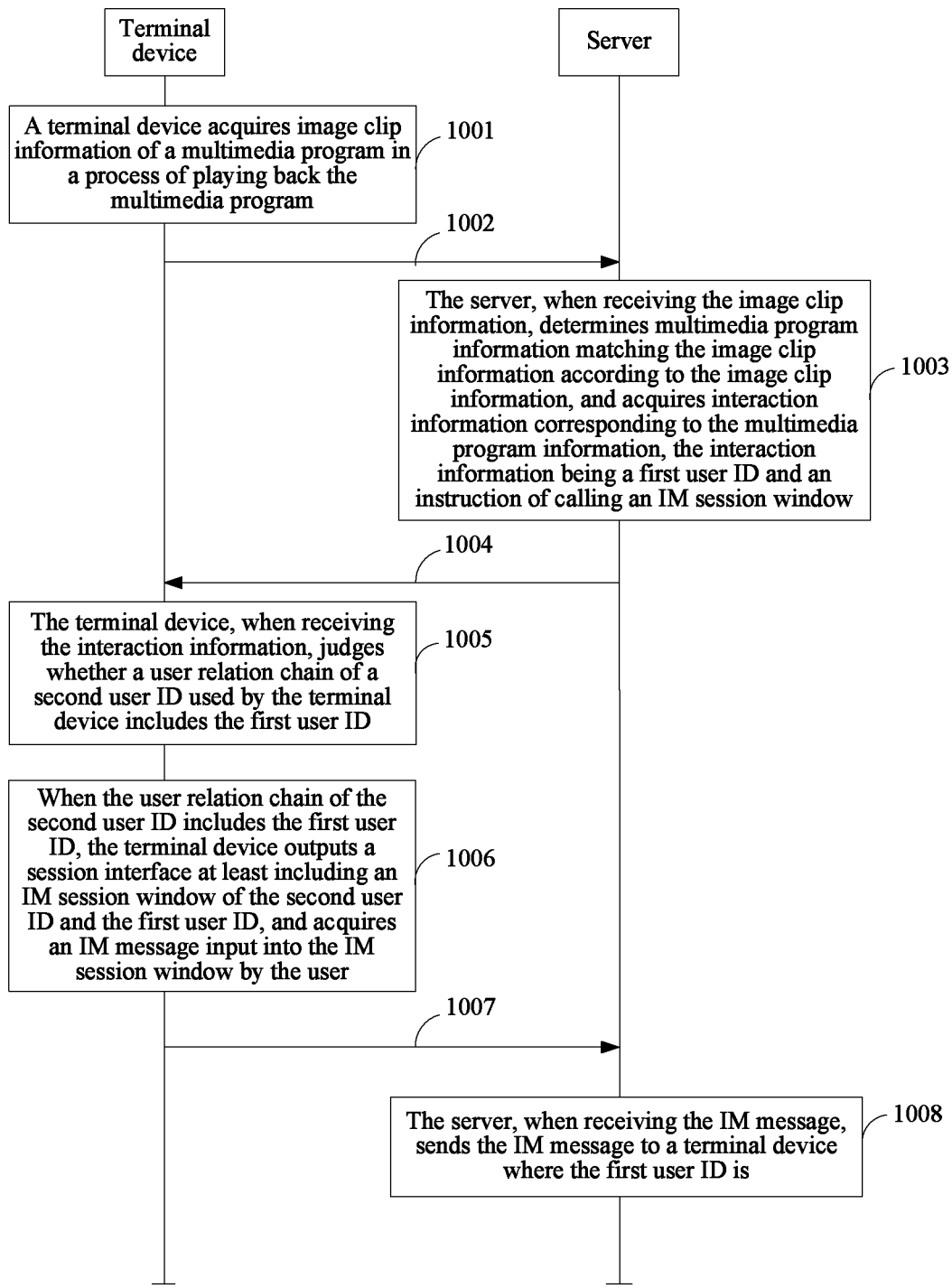
FIG. 10A is a flowchart of an interaction method based on multimedia programs according to one embodiment of the present invention.

FIG. 10A is a flowchart of an interaction method based on multimedia programs according to one embodiment of the present invention. Interaction bodies in the embodiment of the present invention are a terminal device and a server; for ease of description, the embodiment of the present invention takes that the image clip information includes character-related content as an example, and interaction information corresponding to the image clip information is a first user ID of the character; referring to FIG. 10A, the method includes:

1001. A terminal device acquires image clip information of a multimedia program in a process of playing back the multimedia program.

1002. The terminal device sends the image clip information to the server.

Steps 1001-1002 are similar to steps 401-402, and are not repeated herein.

1003. The server, when receiving the image clip information, determines multimedia program information matching the image clip information according to the image clip information, and acquires interaction information corresponding to the multimedia program information, the interaction information being a first user ID and an instruction of calling an IM session window.

When the image clip information includes content related to a character, the interaction information is a first user ID of the character, and the first user ID may be a private user ID or public user ID of the character. The image clip information may include a human face picture, the server identifies the image clip information, determines a character of the human face picture, and determines that the interaction information is a first user ID of the character. For example, the server identifies the image clip information, determines that the image clip information include Lin Zhiling's human face picture, and determines that the interaction information is Lin Zhiling's public account. When the terminal device acquires audio clip information, the audio clip information may include a broadcast character name, and the server identifies the audio clip information, acquires the character name, and determines that the interaction information is a first user ID of the character. For example, the audio clip information includes "Welcome Lin Zhiling to be a guest of the talk show", and the server identifies the audio clip information, determines that the audio clip information includes a character name "Lin Zhiling", and determines that the interaction information is Lin Zhiling's public account.

1004. The server sends the interaction information to the terminal device.

1005. The terminal device, when receiving the interaction information, judges whether a user relation chain of a second user ID used by the terminal device includes the first user ID.

In the embodiment of the present invention, the terminal device logs on to the server based on the second user ID, to exchange information with the server. The server can maintain a user relation chain of each user ID, and the user relation chain of the second user ID includes at least one user ID concerned by the second user ID.

The terminal device, when receiving the first user ID and the instruction of call an IM session window, judges whether a user relation chain of a second user ID used by the terminal device includes the first user ID. When the user relation chain includes the first user ID, it indicates that the second user ID has paid attention to the first user ID, and the terminal device, in response to the instruction, calls an IM session window of the second user ID and the first user ID, and displays a session interface at least including the IM session window. When the user relation chain does not include the first user ID, it indicates that the second user ID has not paid attention to the first user ID, and the terminal device displays a details interface at least including details information and an attention option of the first user ID, so that the user can browse the details information of the first user ID and determine whether to attention on the first user ID according to the details information.

It should be noted that, the judgment process may be performed by the server, that is, the server, when acquiring the first user ID, acquires a second user ID used by the terminal device, and judges whether a user relation chain of the second user ID includes the first user ID, if yes, the server sends the first user ID and the instruction of calling an IM session window to the terminal device, and if no, the server sends the first user ID to the terminal device.

1006. When the user relation chain of the second user ID includes the first user ID, the terminal device outputs a session interface at least including an IM session window of the second user ID and the first user ID, and acquires an IM message input into the IM session window by the user.

Figure 10B:
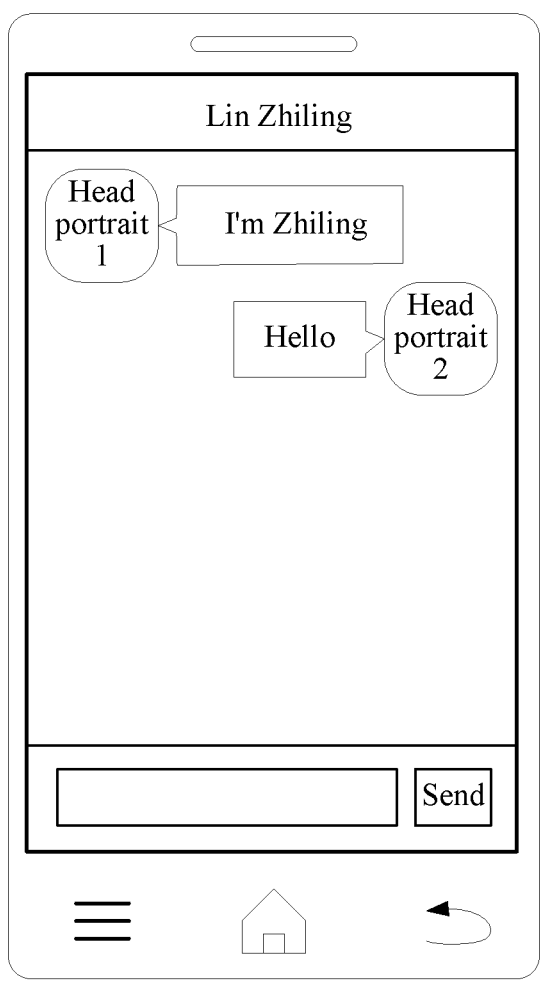
FIG. 10B is a schematic diagram of a session interface according to one embodiment of the present invention.

Referring to FIG. 10B, the IM session window in the session interface includes the first user ID "Lin Zhiling", a head portrait "Head portrait 1" of the first user ID, a head portrait "Head portrait 2" of the second user ID, an IM message input field and a "Send" key, and the terminal device, when detecting the user's click operation on the "Send" key, acquires an IM message "hello" input into the IM message input field by the user, and sends the IM message "hello" to the server based on the second user ID, so that the server, when receiving the IM message, sends the IM message to a terminal device where the first user ID "Lin Zhiling" is.

1007. The terminal device sends the IM message to the server based on the second user ID.

1008. The server, when receiving the IM message, sends the IM message to a terminal device where the first user ID is.

In another embodiment provided in the embodiment of the present invention, steps 1006-1008 can be replaced with the following step: when the user relation chain of the second user ID does not include the first user ID, outputting, by the terminal device, a details interface at least including details information and an attention option of the first user ID. The terminal device, when detecting the user's click operation on the attention option in the details interface, sends an attention request for the first user ID to the server based on the second user ID, and the server, when receiving the attention request, adds the first user ID to the user relation chain of the second user ID.

Figure 10C:
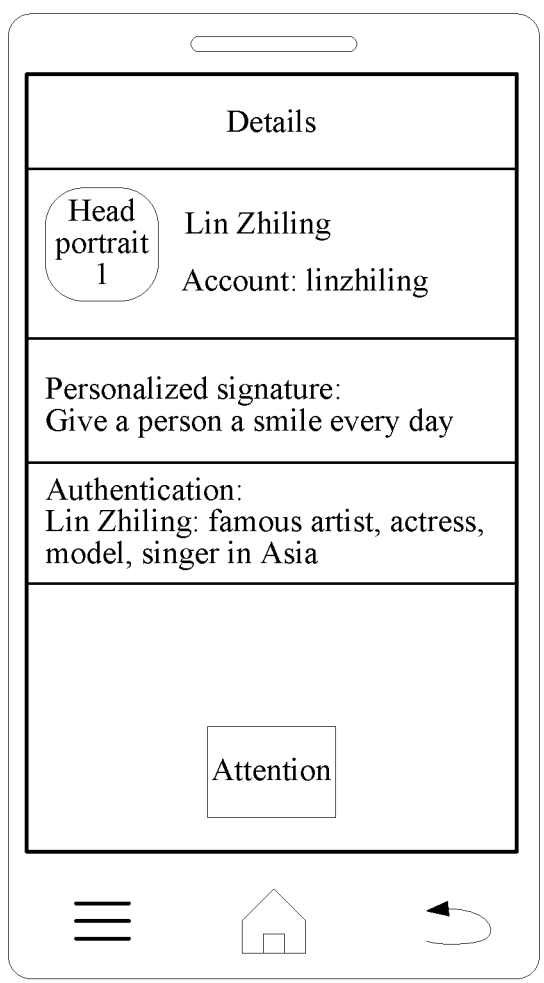
FIG. 10C is a schematic diagram of a details interface according to one embodiment of the present invention.

Referring to FIG. 10C, the details interface include the first user ID "Lin Zhiling", a head portrait "Head portrait 1" of the first user ID, an account "linzhiling", personalized signature "Give a person a smile every day", authentication information "Lin Zhiling: famous artist, actress, model, singer in Asia" and an "attention" key. The server, when detecting the user's click operation on the "attention" key, sends an attention request for the first user ID "Lin Zhiling" to the server based on the second user ID, the server, when receiving the attention request, adds the first user ID "Lin Zhiling" to the user relation chain of the second user ID, and the terminal device can receive an IM message sent by the first user ID "Lin Zhiling", or sends an IM message to a terminal device where the first user ID "Lin Zhiling" is.

The method in the embodiment of the present invention takes that the interaction information is a first user ID as an example, the playback device can guide users to transfer the IM message to the first user ID or pay attention to the first user ID each time the playback device plays back the multimedia program, thereby prolonging effective time, which is easy to operate, improves interaction efficiency, increases the number of users participating in interaction, and enhances user viscosity.

Figure 11A:
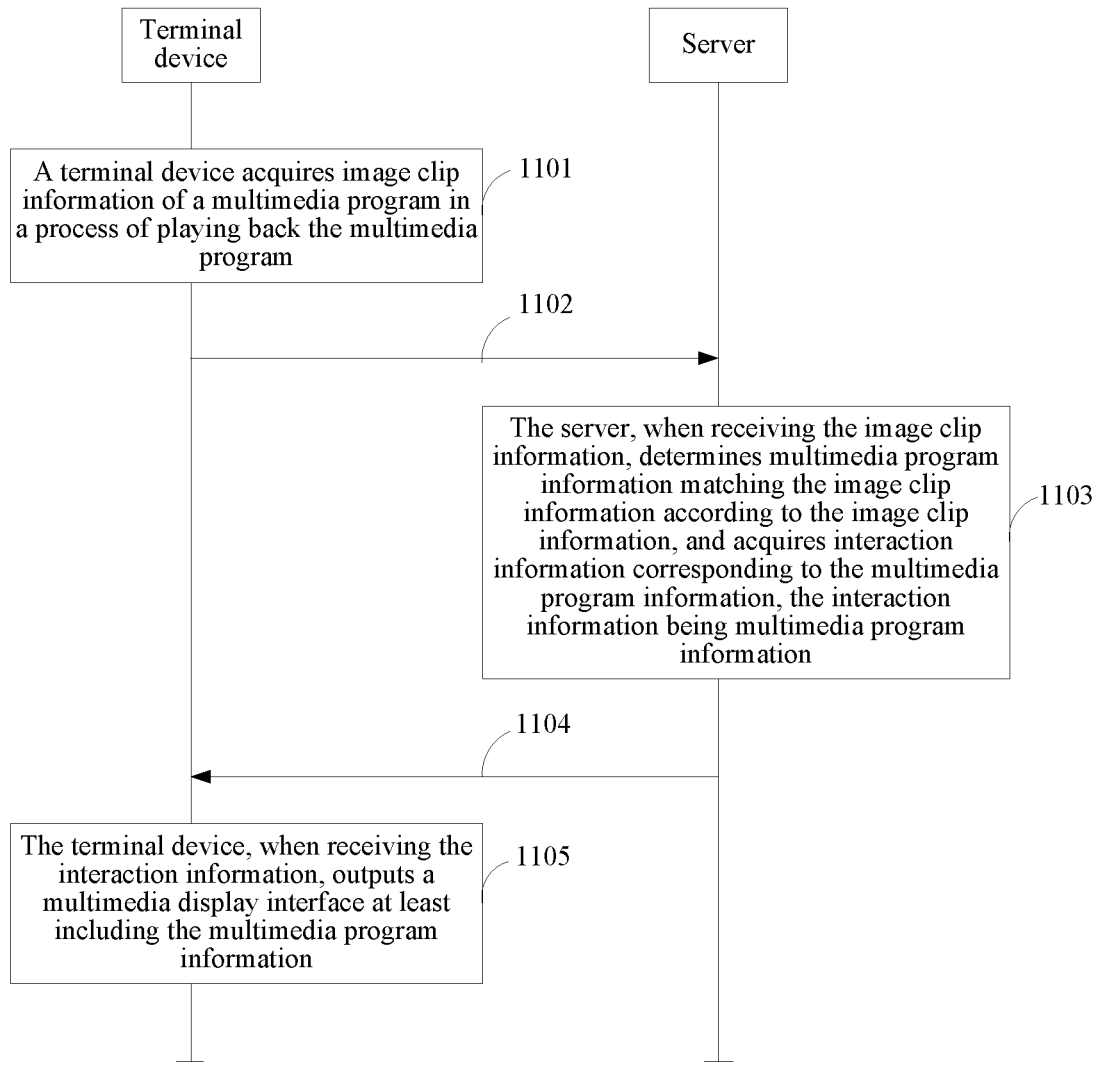
FIG. 11A is a flowchart of an interaction method based on multimedia programs according to one embodiment of the present invention.

FIG. 11A is a flowchart of an interaction method based on multimedia programs according to one embodiment of the present invention. Interaction bodies in the embodiment of the present invention are a terminal device and a server; for ease of description, the embodiment of the present invention takes that interaction information corresponding to the image clip information is multimedia program information as an example; referring to FIG. 11A, the method includes:

1101. A terminal device acquires image clip information of a multimedia program in a process of playing back the multimedia program.

1102. The terminal device sends the image clip information to the server.

Steps 1101-1102 are similar to steps 401-402, and are not repeated herein.

1103. The server, when receiving the image clip information, determines multimedia program information matching the image clip information according to the image clip information, and acquires interaction information corresponding to the multimedia program information, the interaction information being multimedia program information.

When the server identifies the image clip information but does not acquire keywords, key pictures and other information, it can be determined that interaction information corresponding to the image clip information is multimedia program information of the multimedia program.

In terms of content of the multimedia program information, the multimedia program information may include a link address of the multimedia program, user IDs where the multimedia program has been played, recommended multimedia programs and the like, and in terms of format of the multimedia program information, the multimedia program information may include pictures, text, graphics and text information, video and the like, which is not limited in the embodiment of the present invention.

It should be noted that, when the multimedia program information includes the link address of the multimedia program, the terminal device, when acquiring multimedia program information returned by the server, can jump to the link address of the multimedia program, to play back the multimedia program. When the terminal device is a device independent of the playback device, in the process that the playback device plays back the multimedia program, the user can watch the multimedia program on the terminal device only by scanning the display screen with the terminal device to or shaking the terminal device, thereby achieving projection of the multimedia program from the playback device to the terminal device, and operations are easy and quick.

1104. The server sends the interaction information to the terminal device.

1105. The terminal device, when receiving the interaction information, outputs a multimedia display interface at least including the multimedia program information.

Figure 11B:
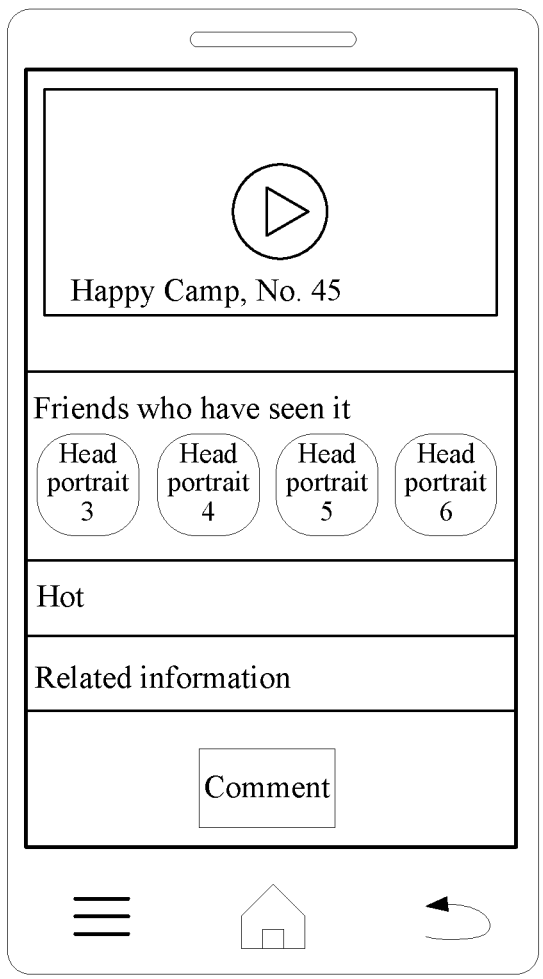
FIG. 11B is a schematic diagram of a multimedia display interface according to one embodiment of the present invention.

Referring to FIG. 11B, the multimedia display interface includes a playback key of a multimedia program "Happy Camp, No. 45", the user relation chain of the second user ID includes head portraits "Head portrait 3" to "Head portrait 6" of user IDs where the "Happy Camp" has been played, a "hot" option, a "related information" option and a "comment" key. The terminal device, when detecting a click operation on the playback key, plays back the multimedia program "Happy Camp, No. 45 the terminal device, when detecting a click operation on the "related information" option, displays a message related to the program "Happy Camp", and the terminal device, when detecting a click operation on the "comment" key, displays a comment input field, so that the user inputs a comment upon the multimedia program "Happy Camp, No. 45" into the comment input field.

The method in the embodiment of the present invention takes that the interaction information is multimedia program information as an example, the playback device can guide users to browse the multimedia program information each time the playback device plays back the multimedia program, thereby prolonging effective time, operations are easy, and interaction efficiency is increased; moreover, the terminal device and the playback device achieve dual-screen interaction, when users browse the multimedia program information on the terminal device, the playback device may continue to play back the multimedia program, continuity is strong, and it is unnecessary to interrupt the process that the users watch the multimedia program, thereby increasing the number of users participating in the interaction and enhancing user viscosity. Further, when the multimedia program information includes the link address of the multimedia program, the terminal device can play back the multimedia program, thereby achieving projection of the multimedia program from the playback device to the terminal device, and operations are easy and quick.

Figure 12:
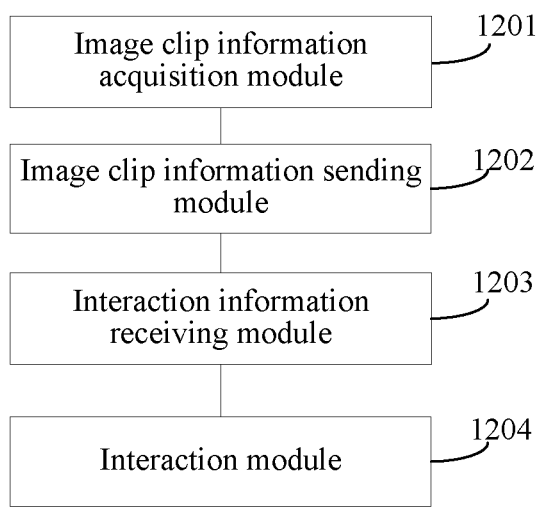
FIG. 12 is a schematic structural diagram of a terminal device according to one embodiment of the present invention.

FIG. 12 is a schematic structural diagram of a terminal device according to one embodiment of the present invention. Referring to FIG. 12, the terminal device includes:

an image clip information acquisition module 1201, configured to acquire at least one image clip information of a multimedia program in a process of playing back the multimedia program;

an image clip information sending module 1202, configured to send the image clip information, the image clip information being used for matching corresponding multimedia program information;

an interaction information receiving module 1203, configured to receive interaction information corresponding to the multimedia program information; and an interaction module 1204, configured to output an interactive interface, to interact with the multimedia program based on an interaction operation on the interactive interface.

According to the terminal device in the embodiment of the present invention, clip information of a multimedia program is acquired in a process of playing back the multimedia program, interaction information corresponding to the clip information is received, an interactive interface at least including the interaction information is output according to the interaction information, and a user can perform an interaction operation on the interactive interface to interact with the server. As participation in interaction can be done by a simple interaction operation on the interactive interface, the operation is easy, thereby improving interaction efficiency The image clip information acquisition module 1201 includes:

a scanning unit, configured to scan a display screen where the multimedia program is played, to obtain the at least one image clip information of the multimedia program.

The interaction module 1204 includes:

a first interaction unit, configured to, when the interaction information includes multiple candidate options, output an interactive interface at least including the multiple candidate options, and when a selection operation on a specified candidate option in the interactive interface is detected, send the specified candidate option.

The interaction module 1204 includes:

a second interaction unit, configured to, when the interaction information includes prompt information, output an interactive interface at least including the prompt information and an input field, acquire response information input in the input field, and send the response information.

The interaction module includes:

a third interaction unit, configured to, when the interaction information includes lottery information, output an interactive interface at least including the lottery information, receive a lottery result, and display the lottery result in the lottery interface.

The interaction module 1204 includes:

a fourth interaction unit, configured to, the interaction information includes a target value, output a target display interface at least including the target value and an exchange option, if a click operation on the exchange option is detected, output a value transfer interface at least including the target value and a value transfer option, and if a click operation on the value transfer option is detected, send a value transfer request for the target; or a fifth interaction unit, configured to, when the interaction information includes a target value, output a value transfer interface at least including the target value and a value transfer option, and if a click operation on the value transfer option is detected, send a value transfer request for the target.

The interaction module 1204 includes:

a judgment unit, configured to, when the interaction information Isa first user ID and an instruction of calling an IM session window, judge whether a user relation chain of a second user ID used by the terminal device includes the first user ID;

a sixth interaction unit, configured to, when the user relation chain of the second user ID includes the first user ID, output an interactive interface at least including an IM session window of the second user ID and the first user ID, acquire IM messages input in the IM session window, and send the IM messages based on the second user ID; or a seventh interaction unit, configured to, when the user relation chain of the second user ID does not include the first user ID, output an interactive interface at least including details information and attention option of the first user ID, and if a click operation on the attention option in the interactive interface is detected, send an attention request for the first user ID.

The interaction module 1204 includes:

an eighth interaction unit, configured to, when the interaction information is multimedia program information, output an interactive interface at least including the multimedia program information, the interactive interface being configured to display the multimedia program information.

All the above optional technical solutions can form optional embodiments of the present invention in any combination, which are not repeated herein one by one.

It should be noted that, when the terminal device in the embodiments interacts with the server based on a multimedia program playback process, illustration is given only according to division of the functional modules, and during actual applications, the functions can be assigned to and completed by different functional modules as required, that is, an internal structure of the terminal device is divided into different functional modules, to complete all or some of the functions. In addition, the terminal device in the embodiments and the embodiments of the interaction method based on multimedia programs belong to the same concept, and reference can be made to the method embodiments for specific implementation process thereof, which is not repeated herein.

Figure 13:
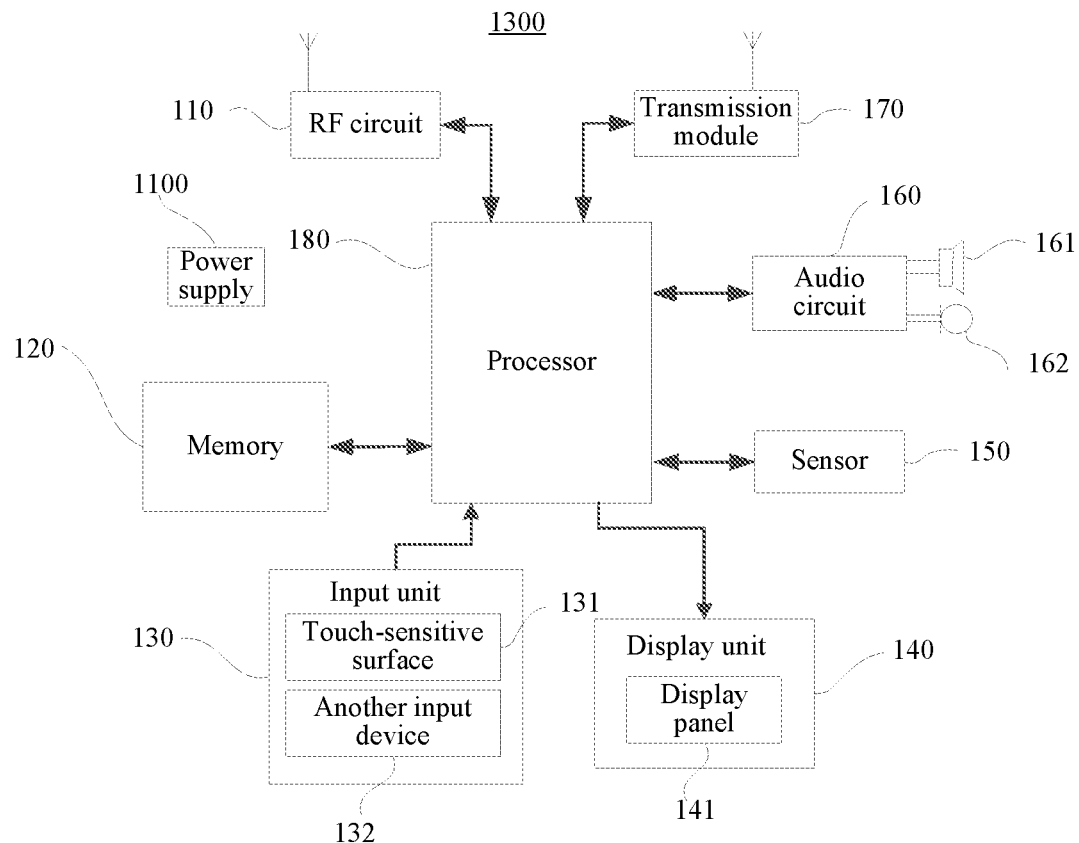
FIG. 13 is a schematic structural diagram of a terminal device according to one embodiment of the present invention.

FIG. 13 is a schematic structural diagram of a terminal device according to one embodiment of the present invention; FIG. 13 illustrates a schematic structural diagram of a terminal device having a touch-sensitive surface involved in an exemplary embodiment of the present invention, and the terminal device can be configured to implement the functions performed by the terminal device in the interaction method based on multimedia programs illustrated in the embodiments. Specifically:

The terminal device 1300 may include components such as a Radio Frequency (RF) circuit 110, a memory 120 including one or more computer readable storage mediums, an input unit 130, a display unit 140, a sensor 150, an audio circuit 160, a transmission module 170, a processor 180 including one or more processing cores, and a power supply 1100. A person skilled in the art may understand that the structure of the terminal device shown in FIG. 13 does not constitute a limitation to the terminal device, and the terminal device may include more components or fewer components than those shown in the figure, or some components may be combined, or a different component deployment may be used.

The RF circuit 110 may be configured to receive and send signals during an information receiving and sending process or a call process. Particularly, the RF circuit 110 receives downlink information from a base station, then delivers the downlink information to the one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a software program and module, for example, the software program and module corresponding to the terminal device shown in the exemplary embodiment. The processor 180 runs the software program and module stored in the memory 120, to implement various functional applications and data processing, for example, implement video-based interaction and the like. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal device 1300, and the like. In addition, the memory 120 may include a high speed random access memory, and may also include anon-volatile memory, such as at least one magnetic disk storage device, a flash memory, or another volatile solid-state storage device. Correspondingly, the memory 120 may further include a memory controller, so as to provide access of the processor 180 and the input unit 130 tithe memory 120.

The input unit 130 may be configured to receive input digit or character information, and generate a keyboard, mouse, joystick, optical, or track ball signal input related to the user setting and function control. Specifically, the input unit 130 may include a touch-sensitive surface 131 and another input device 132. The touch-sensitive surface 131, which may also be referred to as a touch screen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be may be a resistive, capacitive, infrared, or surface sound wave type touch-sensitive surface. In addition to the touch-sensitive surface 131, the input unit 130 may further include the other input device 132. Specifically, the another input device 132 may include, but is not limited to, one or more of a physical keyboard, afunctional key (such as a volume control key or a switch key), a trackball, a mouse, and a joystick.

The display unit 140 may be configured to display information input by the user or information provided for the user, and various graphical user interfaces of the terminal device 1300. The graphical user interfaces may be formed by a graph, a text, an icon, a video, or any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 13, the touch-sensitive surface 131 and the display panel 141 are used as two separate parts to implement input and output functions, in some embodiments, the touch-sensitive surface 131 and the display panel 141 may be integrated to implement the input and output functions.

The terminal device 1300 may further include at least one sensor 150, such as an optical sensor, a motion sensor, and other sensors. Specifically, the optical sensor may include an ambient light sensor and a proximity sensor. The ambient light sensor can adjust luminance of the display panel 141 according to brightness of the ambient light. The proximity sensor may switch off the display panel 141 and/or backlight when the terminal device 1300 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal device 1300, are not further described herein.

The audio circuit 160, a loudspeaker 161, and a microphone 162 may provide audio interfaces between the user and the terminal device 1300. The audio circuit 160 may convert received audio data into an electric signal and transmit the electric signal to the loudspeaker 161. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal device by using the RF circuit 110, or outputs the audio data to the memory 120 for further processing. The audio circuit 160 may further include an earplug jack, so as to provide communication between a peripheral earphone and the terminal device 1300.

The terminal device 1300 may help, by using the transmission module 170, the user to receive and send e-mails, browse a webpage, access streaming media, and so on, which provides wireless broadband Internet access for the user. Although FIG. 13 shows the transmission module 170, it may be understood that the transmission module is not a necessary component of the terminal device 1300, and when required, the transmission module may be omitted as long as the scope of the essence of the present disclosure is not changed.

The processor 180 is the control center of the terminal device 1300, and is connected to various parts of the mobile phone by using various interfaces and lines. By running or executing the software program and/or module stored in the memory 120, and invoking data stored in the memory 120, the processor 180 performs various functions and data processing of the terminal device 1300, thereby performing overall monitoring on the mobile phone. Optionally, the processor 180 may include one or more processing cores; the processor 180 may integrate an application processor and a modem. The application processor mainly processes an operating system, a user interface, an application program, and the like. The modem mainly processes wireless communication. It may be understood that the foregoing modem may also not be integrated into the processor 180.

The terminal device 1300 further includes the power supply 1100 (such as a battery) for supplying power to the components. Preferably, the power supply may be logically connected to the processor 180 by using a power management system, thereby implementing functions such as charging, discharging and power consumption management by using the power management system. The power supply 1100 may further include one or more of a direct current or alternating current power supply, a re-charging system, a power failure detection circuit, a power supply converter or inverter, a power supply state indicator, and any other components.

Although not shown in the figure, the terminal device 1300 may further include a camera, a Bluetooth module, and the like, which are not further described herein. Specifically, in this embodiment, the display unit of the terminal device is a touch screen display, and the terminal device further includes a memory and one or more programs. The one or more programs are stored in the memory and configured to be executed by one or more processors. The one or more programs contain instructions used for implementing the following operations:

acquiring at least one image clip information of a multimedia program in a process of playing back the multimedia program;

sending the image clip information, the image clip information being used for matching corresponding multimedia program information;

receiving interaction information corresponding to the multimedia program information; and outputting an interactive interface, to interact with the multimedia program based on an interaction operation on the interactive interface.

The memory of the terminal device further includes an instruction used for implementing the following operation:

scanning a display screen where the multimedia program is played, to obtain the at least one image clip information of the multimedia program.

The memory of the terminal device further includes an instruction used for implementing the following operation:

when the interaction information includes multiple candidate options, outputting an interactive interface at least including the multiple candidate options, and when a selection operation on a specified candidate option in the interactive interface is detected, sending the specified candidate option.

The memory of the terminal device further includes an instruction used for implementing the following operation:

when the interaction information includes prompt information, outputting an interactive interface at least including the prompt information and an input field, acquiring response information input in the input field, and sending the response information.

The memory of the terminal device further includes an instruction used for implementing the following operation:

when the interaction information includes lottery information, outputting an interactive interface at least including the lottery information, receiving a lottery result, and displaying the lottery result in the lottery interface.

The memory of the terminal device further includes an instruction used for implementing the following operations:

when the interaction information includes a target value, outputting a target display interface at least including the target value and an exchange option, if a click operation on the exchange option is detected, outputting a value transfer interface at least including the target value and a value transfer option, and if a click operation on the value transfer option is detected, sending a value transfer request for the target; or when the interaction information includes a target value, outputting a value transfer interface at least including the target value and a value transfer option, and if a click operation on the value transfer option is detected, sending a value transfer request for the target.

The memory of the terminal device further includes an instruction used for implementing the following operations:

when the interaction information is a first user ID and an instruction of calling an IM session window, judging whether a user relation chain of a second user ID used by the terminal device includes the first user ID;

when the user relation chain of the second user ID includes the first user ID, outputting an interactive interface at least including an IM session window of the second user ID and the first user ID, acquiring IM messages input in the IM session window, and sending the IM messages based on the second user ID; or when the user relation chain of the second user ID does not include the first user ID, outputting an interactive interface at least including details information and attention option of the first user ID, and if a click operation on the attention option in the interactive interface is detected, sending an attention request for the first user ID.

The memory of the terminal device further includes an instruction used for implementing the following operations:

when the interaction information is multimedia program information, outputting an interactive interface at least including the multimedia program information, the interactive interface being configured to display the multimedia program information.

All the above optional technical solutions can form optional embodiments of the present invention in any combination, which are not repeated herein one by one.

Figure 14:
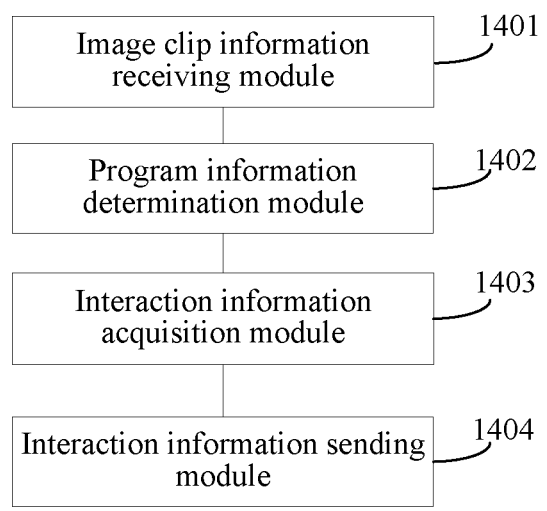
FIG. 14 is a schematic structural diagram of a server according to one embodiment of the present invention.

FIG. 14 is a schematic structural diagram of a server according to one embodiment of the present invention; referring to FIG. 14, the server includes:

an image clip information receiving module 1401, configured to receive image clip information of a multimedia program, the image clip information being acquired in a process of playing back the multimedia program;

a program information determination module 1402, configured to determine multimedia program information matching the image clip information according to the image clip information;

an interaction information acquisition module 1403, configured to acquire interaction information corresponding to the image clip information; and an interaction information sending module 1404, configured to send the interaction information.

According to the server in the embodiment of the present invention, the server, when receiving clip information sent by a terminal device, returns interaction information corresponding to the clip information to the terminal device, and a user can interact with the server on the terminal device according to the interaction information. As participation in interaction can be done by a simple interaction operation on the interactive interface, the operation is easy, thereby improving interaction efficiency.

The program information determination module 1402 includes:

a program information determination unit, configured to traverse image information of each multimedia program stored, determine image information matching the image clip information, and determine multimedia program information of the matched image information.

The server further includes:

a screenshot module, configured to take a screenshot of each multimedia program, to obtain a plurality of image information.

The server further includes:

a first interaction module, configured to, when the interaction information includes multiple candidate options, if a specified candidate option is received, increase the number of the specified candidate option; or a second interaction module, configured to, when the interaction information includes multiple candidate options, if a specified candidate option is received, judge whether the specified candidate option is correct, and send virtual reward data according to a judgment result.

The server further includes:

a third interaction module, configured to, when the interaction information includes prompt information, if response information is received, judge whether the response information is correct, and send virtual reward data according to a judgment result; or a fourth interaction module, configured to, when the interaction information includes prompt information, if response information is received, release the response information; or a fifth interaction module, configured to, when the interaction information is lottery information, acquire a lottery result corresponding to the lottery information, and send the lottery result.

The server further includes:

a sixth interaction module, configured to, when the interaction information includes a target value, if a value transfer request for the target is received, perform a value transfer operation according to the value, account information corresponding to the target and account information corresponding to a terminal device that sends the value transfer request.

The server further includes:

a seventh interaction module, configured to, when the interaction information is a first user ID and an instruction of calling an IM session window, if an IM message is received, send the IM message to a terminal device where the first user ID is; or an eighth interaction module, configured to, when the interaction information is a first user ID and an instruction of calling an IM session window, if an attention request sent by a terminal device is received, add the first user ID to a user relation chain of the terminal device.

All the above optional technical solutions can form optional embodiments of the present invention in any combination, which are not repeated herein one by one.

It should be noted that, when the server in the embodiments interacts with the terminal device based on a multimedia program playback process, illustration is given only according to division of the functional modules, and during actual applications, the functions can be assigned to and completed by different functional modules as required, that is, an internal structure of the server is divided into different functional modules, to complete all or some of the functions. In addition, the server in the embodiments and the embodiments of the interaction method based on multimedia programs belong to the same concept, and reference can be made to the method embodiments for specific implementation process thereof, which is not repeated herein.

Figure 15:
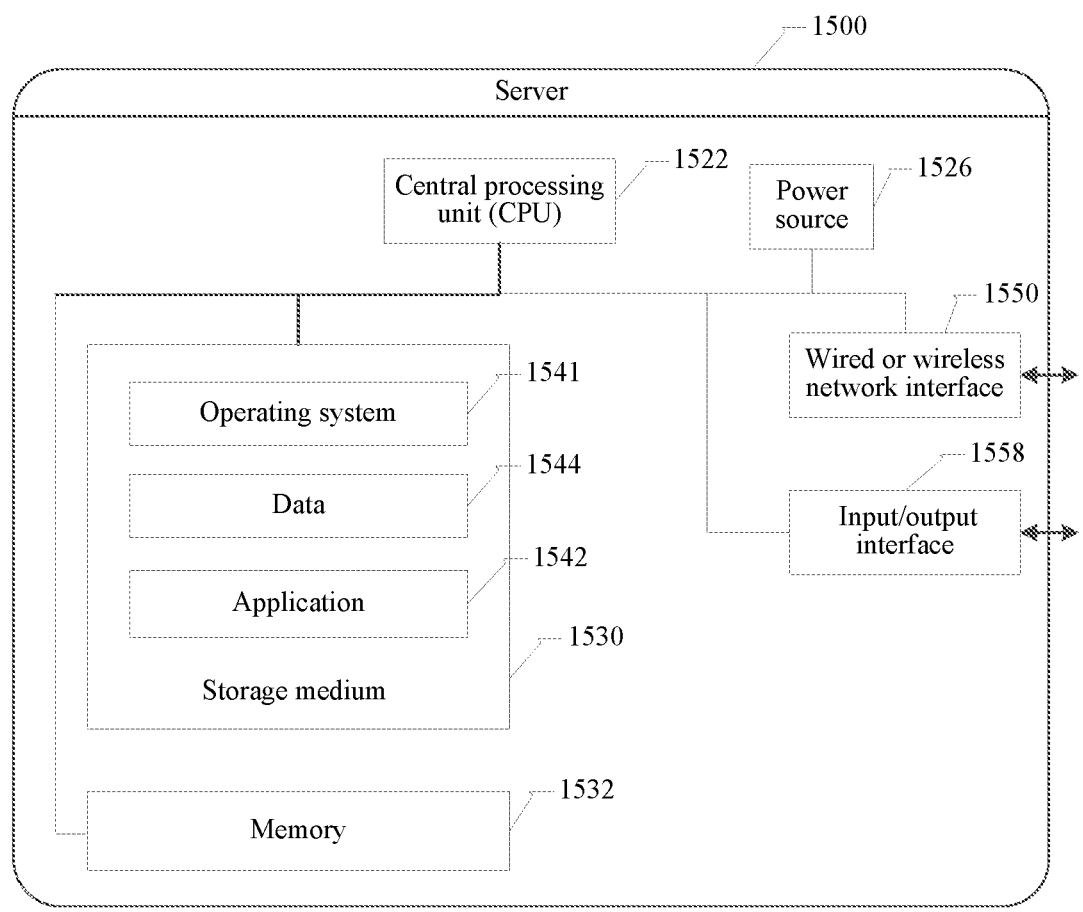
FIG. 15 is a schematic structural diagram of a server according to one embodiment of the present invention.

FIG. 15 is a schematic structural diagram of a server according to one embodiment of the present invention; the server can be configured to implement the functions performed by the server in the interaction method based on multimedia programs illustrated in the embodiments. Specifically, referring to FIG. 15, the server 1500 may vary greatly due to different configuration or performance, and may include one or more central processing units (CPUs) 1522 (for example, one or more processors) and a memory 1532, one or more storage mediums 1530 (for example, one or more mass storage devices) that store an application 1542 or data 1544. The memory 1532 and the storage mediums 1530 may be temporary storage or permanent storage. The program stored in the storage mediums 1530 may include one or more modules (not shown).

The server 1500 may further include one or more power sources 1526, one or more wired or wireless network interfaces 1550, one or more input/output interfaces 1558, and/or one or more operating systems 1541, for example, Windows Server™, Mac OS X™, Linux™, FreeBSD™ and the like.

One or more programs are stored in the memory, and are configured to be performed by one or more processors, the one or more programs containing instructions used for performing the following operations:

receiving image clip information of a multimedia program, the image clip information being acquired in a process of playing back the multimedia program;

determining multimedia program information matching the image clip information according to the image clip information;

acquiring interaction information corresponding to the multimedia program information; and sending the interaction information.

An instruction used for performing the following operation is further included:

traversing image information of each multimedia program stored, determining the image information matching the image clip information, and determining multimedia program information of the matched image information.

An instruction used for performing the following operation is further included:

taking a screenshot of each multimedia program, to obtain a plurality of image information.

An instruction used for performing the following operation is further included:

when the interaction information includes multiple candidate options, if a specified candidate option is received, increasing the number of the specified candidate option; or when the interaction information includes multiple candidate options, if a specified candidate option is received, judging whether the specified candidate option is correct, and sending virtual reward data according to a judgment result.

An instruction used for performing the following operation is further included:

when the interaction information includes prompt information, if response information is received, judging whether the response information is correct, and sending virtual reward data according to a judgment result; or when the interaction information includes prompt information, if response information is received, releasing the response information; or when the interaction information is lottery information, acquiring a lottery result corresponding to the lottery information, and sending the lottery information.

An instruction used for performing the following operation is further included:

when the interaction information includes a target value, if a value transfer request for the target is received, performing a value transfer operation according to the value, account information corresponding to the target and account information corresponding to a terminal device that sends the value transfer request.

An instruction used for performing the following operation is further included:

when the interaction information is a first user ID and an instruction of calling an IM session window, if an IM message is received, sending the IM message to a terminal device where the first user ID is located; or when the interaction information is a first user ID and an instruction of calling an IM session window, if an attention request sent by a terminal device is received, adding the first user ID to a user relation chain of the terminal device.

All the above optional technical solutions can form optional embodiments of the present invention in any combination, which are not repeated herein one by one.

Figure 16:
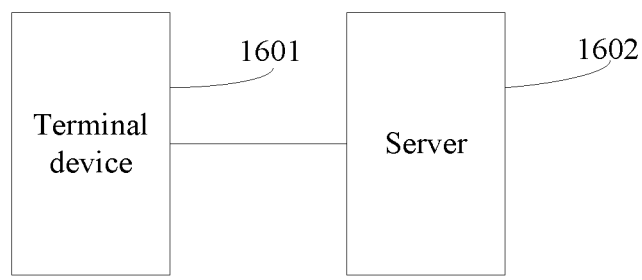
FIG. 16 is a schematic structural diagram of an interaction system based on multimedia programs according to one embodiment of the present invention.

FIG. 16 is a schematic structural diagram of an interaction system based on multimedia programs according to one embodiment of the present invention; referring to FIG. 16, the system includes: a terminal device 1601 and a server 1602;

the terminal device 1601 is configured to acquire at least one image clip information of a multimedia program in a process of playing back the multimedia program;

the terminal device 1601 is further configured to send the image clip information to the server 1602, the image clip information being used for matching corresponding multimedia program information;

the server 1602 is configured to, when receiving the image clip information, determine multimedia program information matching the image clip information according to the image clip information, and acquire interaction information corresponding to the multimedia program information;

the server 1602 is further configured to send the interaction information to the terminal device 1601; and the terminal device 1601 is further configured to, when receiving the interaction information, output an interactive interface, and interact with the multimedia program based on an interaction operation on the interactive interface.

The terminal device 1601 is further configured to scan a display screen where the multimedia program is played, to obtain the at least one image clip information of the multimedia program.

The server 1602 is further configured to traverse image information of each multimedia program stored, determine the image information matching the image clip information, and determine multimedia program information of the matched image information.

The server 1602 is further configured to take a screenshot of each multimedia program, to obtain a plurality of image information.

All the above optional technical solutions can form optional embodiments of the present invention in any combination, which are not repeated herein one by one.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. An interaction method based on multimedia programs, running in a server, the server comprising a memory and one or more processors, and a program instruction being stored in the memory and executed by the one or more processors, the method comprising:

receiving image clip information of a multimedia program from a playback device, the image clip information being acquired in a process of playing back the multimedia program by the playback device adjacent to a terminal device;

determining multimedia program information matching the image clip information and an interaction form according to the image clip information;

acquiring interaction information corresponding to the multimedia program information, wherein the interaction information includes a first user ID of an instant messaging (IM) application and an instruction of invoking the IM application; and sending the interaction information to the terminal device, wherein the terminal device is configured to output, according to the interaction information, an interactive interface at least comprising the interaction form, to interact with the multimedia program based on the interaction form, the interaction form referring to a type of information sent and received by the terminal device based on an interaction operation on the interactive interface.

2. The method according to claim 1, wherein the determining multimedia program information matching the image clip information according to the image clip information comprises:

traversing image information of each multimedia program stored;

determining the image information matching the image clip information; and determining multimedia program information of the matched image information.

3. The method according to claim 2, wherein, before the determining multimedia program information matching the image clip information according to the image clip information, the method further comprises:

taking a screenshot of each multimedia program, to obtain a plurality of image information.

4. The method according to claim 1, wherein, after the sending the interaction information, the method further comprises:
when the interaction information comprises multiple candidate options, if a specified candidate option is received, increasing the number of the specified candidate option; and
when the interaction information comprises multiple candidate options, if a specified candidate option is received, judging whether the specified candidate option is correct, and sending virtual reward data according to a judgment result.

5. The method according to claim 1, wherein, after the sending the interaction information, the method further comprises:
when the interaction information comprises prompt information, if response information is received, judging whether the response information is correct, and sending virtual reward data according to a judgment result;
when the interaction information comprises prompt information, if response information is received, releasing the response information; and
when the interaction information is lottery information, acquiring a lottery result corresponding to the lottery information, and sending the lottery information.

6. The method according to claim 1, wherein, after the sending the interaction information, the method further comprises:
when the interaction information comprises a target value, if a value transfer request for the target is received from the terminal device, performing a value transfer operation according to the value, account information corresponding to the target and account information corresponding to the terminal device that sends the value transfer request.

7. The method according to claim 1, wherein, after the sending the interaction information, the method further comprises:
after an IM message is received, sending the IM message to the terminal device associated with the first user ID; and
after an attention request sent by the terminal device is received, adding the first user ID to a user relation chain of the terminal device.

8. A server, comprising: a memory; one or more processors; and one or more program modules stored in the memory that, when executed by the one or more processors, cause the server to perform operations including:
receiving image clip information of a multimedia program from a playback device, the image clip information being acquired in a process of playing back the multimedia program by the playback device adjacent to a terminal device;
determining multimedia program information matching the image clip information and an interaction form according to the image clip information;
acquiring interaction information corresponding to the multimedia program information, wherein the interaction information includes a first user ID of an instant messaging (IM) application and an instruction of invoking the IM application; and
sending the interaction information to the terminal device, wherein the terminal device is configured to output, according to the interaction information, an interactive interface at least comprising the interaction form, to interact with the multimedia program based on the interaction form, the interaction form referring to a type of information sent and received by the terminal device based on an interaction operation on the interactive interface.

9. The server according to claim 8, wherein the operation of determining multimedia program information matching the image clip information according to the image clip information comprises:
traversing image information of each multimedia program stored;
determining the image information matching the image clip information; and
determining multimedia program information of the matched image information.

10. The server according to claim 9, wherein the operations further comprise:
before determining multimedia program information matching the image clip information according to the image clip information:
taking a screenshot of each multimedia program, to obtain a plurality of image information.

11. The server according to claim 8, wherein the operations further comprise:
after sending the interaction information:
when the interaction information comprises multiple candidate options, if a specified candidate option is received, increasing the number of the specified candidate option; and
when the interaction information comprises multiple candidate options, if a specified candidate option is received, judging whether the specified candidate option is correct, and sending virtual reward data according to a judgment result.

12. The server according to claim 8, wherein the operations further comprise:
after sending the interaction information:
when the interaction information comprises prompt information, if response information is received, judging whether the response information is correct, and sending virtual reward data according to a judgment result;
when the interaction information comprises prompt information, if response information is received, releasing the response information; and
when the interaction information is lottery information, acquiring a lottery result corresponding to the lottery information, and sending the lottery information.

13. The server according to claim 8, wherein the operations further comprise:
after sending the interaction information:
when the interaction information comprises a target value, if a value transfer request for the target is received from the terminal device, performing a value transfer operation according to the value, account information corresponding to the target and account information corresponding to the terminal device that sends the value transfer request.

14. The server according to claim 8, wherein the operations further comprise:
after sending the interaction information:
after an IM message is received, sending the IM message to the terminal device associated with the first user ID; and
after an attention request sent by the terminal device is received, adding the first user ID to a user relation chain of the terminal device.

15. A non-transitory computer readable storage medium storing one or more program modules that, when executed by a server having one or more processors, cause the server to perform operations including:
- receiving image clip information of a multimedia program from a playback device, the image clip information being acquired in a process of playing back the multimedia program by the playback device adjacent to a terminal device;
- determining multimedia program information matching the image clip information and an interaction form according to the image clip information;
- acquiring interaction information corresponding to the multimedia program information, wherein the interaction information includes a first user ID of an instant messaging (IM) application and an instruction of invoking the IM application; and
- sending the interaction information to the terminal device, wherein the terminal device is configured to output, according to the interaction information, an interactive interface at least comprising the interaction form, to interact with the multimedia program based on the interaction form, the interaction form referring to a type of information sent and received by the terminal device based on an interaction operation on the interactive interface.

16. The non-transitory computer readable storage medium according to claim 15, wherein the operation of determining multimedia program information matching the image clip information according to the image clip information comprises:
- traversing image information of each multimedia program stored;
- determining the image information matching the image clip information; and
- determining multimedia program information of the matched image information.

17. The non-transitory computer readable storage medium according to claim 15, wherein the operations further comprise:
- after sending the interaction information:
  - when the interaction information comprises multiple candidate options, if a specified candidate option is received, increasing the number of the specified candidate option; and
  - when the interaction information comprises multiple candidate options, if a specified candidate option is received, judging whether the specified candidate option is correct, and sending virtual reward data according to a judgment result.

18. The non-transitory computer readable storage medium according to claim 15, wherein the operations further comprise:
- after sending the interaction information:
  - when the interaction information comprises prompt information, if response information is received, judging whether the response information is correct, and sending virtual reward data according to a judgment result;
  - when the interaction information comprises prompt information, if response information is received, releasing the response information; and
  - when the interaction information is lottery information, acquiring a lottery result corresponding to the lottery information, and sending the lottery information.

19. The non-transitory computer readable storage medium according to claim 15, wherein the operations further comprise:
- after sending the interaction information:
  - when the interaction information comprises a target value, if a value transfer request for the target is received from the terminal device, performing a value transfer operation according to the value, account information corresponding to the target and account information corresponding to the terminal device that sends the value transfer request.

20. The non-transitory computer readable storage medium according to claim 15, wherein the operations further comprise:
- after sending the interaction information:
  - after an IM message is received, sending the IM message to the terminal device associated with the first user ID; and
  - after an attention request sent by the terminal device is received, adding the first user ID to a user relation chain of the terminal device.

* * * * *